(12) United States Patent
Bhattacharya et al.

(10) Patent No.: US 9,350,605 B2
(45) Date of Patent: May 24, 2016

(54) METHOD AND APPARATUS FOR MULTI-INSTANCE CONTROL PLANE FOR DYNAMIC MPLS-TP TUNNEL MANAGEMENT VIA IN-BAND COMMUNICATION CHANNEL (G-ACH)

(71) Applicant: Ciena Corporation, Hanover, MD (US)

(72) Inventors: Somen Bhattacharya, Santa Clara, CA (US); Vignesh Radhakrishnan, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 285 days.

(21) Appl. No.: 14/051,800

(22) Filed: Oct. 11, 2013

(65) Prior Publication Data

US 2015/0103691 A1 Apr. 16, 2015

(51) Int. Cl.
*H04L 12/28* (2006.01)
*H04L 12/24* (2006.01)
*H04L 12/723* (2013.01)

(52) U.S. Cl.
CPC ............ *H04L 41/0803* (2013.01); *H04L 45/50* (2013.01)

(58) Field of Classification Search
None
See application file for complete search history.

(56) References Cited

U.S. PATENT DOCUMENTS

| 7,769,885 | B1 * | 8/2010 | Kompella | H04L 45/00 370/219 |
| 9,210,075 | B2 * | 12/2015 | Bhattacharya | H04L 45/50 |
| 2013/0176850 | A1 * | 7/2013 | Mishra | H04L 49/00 370/235 |
| 2013/0259045 | A1 * | 10/2013 | Johansson | H04L 45/306 370/392 |
| 2014/0010072 | A1 * | 1/2014 | Gandhi | H04L 12/4633 370/228 |
| 2015/0009995 | A1 * | 1/2015 | Gross, IV | H04L 45/74 370/392 |

OTHER PUBLICATIONS

Frost et al., MPLS Generic Associated Channel (G-ACH) Advertisement Protocol draft-ietf-mpls-gach-adv-08 (Jun. 7, 2013).*
Bocci et al, MPLS Generic Associated Channel, Request for Comments 5586, 19 pages, Jun. 2009.*
Andersson et al, MPLS Transport Profile (MPLS-TP) Control Plane Framework, Request for Comments 6373, 57 pages, Sep. 2011.*
Beller et al, An Inband Data Communication Network for the MPLS Transport Profile, Internet Draft, 8 pages, May 2009.*

* cited by examiner

*Primary Examiner* — Frank Duong
(74) *Attorney, Agent, or Firm* — Clements Bernard PLLC; Christopher L. Bernard; Lawrence A. Baratta, Jr.

(57) ABSTRACT

A dynamic tunnel management and signaling control plane protocol message is encapsulated in a data plane protocol encapsulating packet and communicated through a data plane channel to a destination label switching node. The destination label switching node extracts information from the dynamic tunnel management and signaling control plane protocol message from the data plane protocol encapsulating packet in the data plane, and performs a dynamic tunnel management process based on the extracted information. Optionally, the data plane channel is a generic associated channel (G-ACH).

17 Claims, 7 Drawing Sheets

METHOD AND APPARATUS FOR MULTI-INSTANCE CONTROL PLANE FOR DYNAMIC MPLS-TP TUNNEL MANAGEMENT VIA IN-BAND COMMUNICATION CHANNEL (G-ACH)

FIELD OF DISCLOSURE

The present application generally relates to control plane management in multiprotocol label switching networks, and in particular, to establishment and monitoring of bi-directional links.

BACKGROUND

Multi-Protocol Label Switching (MPLS) is a network protocol suite for transport of client traffic, independent of client network protocol. An example MPLS network includes a data plane to which label switching routers (LSRs) interface. A head-end or ingress LSR at one edge of the MPLS network receives a packet of client traffic, and applies a label to the packet based on the packet's destination address—which can be a tail end or egress LSR at another edge of the MPLS—and other attributes. Prior to the ingress LSR receiving the packet, data plane paths between the LSRs—termed label switched paths (LSPs), and a label-based forwarding mechanism is programmed in the LSRs. The LSRs associate labeled packets with particular LSPs and forward the labeled packets, LSR-to-LSR, from the ingress LSR to the egress LSR, according to the programmed forwarding mechanism.

Generalized MPLS (GMPLS) has similarity to MPLS, but can use implicit labeling of packets as opposed to explicit label applied by MPLS, to associate packets with LSPs. GMPLS implicit labeling can be according to a physical property or parameter of a signal associated with the received packet. Concepts of this disclosure are described and can be understood in reference to MPLS without specific reference to GMPLS operation. Therefore, to avoid description of GMPLS-specific operations not helpful for understanding concepts, further detailed description of GMPLS is omitted, except where incidental to a described example configuration or operation. For related reasons of brevity, instances of "MPLS" appearing hereinafter will be understood to mean ""MPLS and/or GMPLS," except where explicitly stated otherwise or made clear from its context to mean otherwise.

In known, conventional MPLS techniques, programming of the LSRs to establish LSPs and the forwarding mechanism can be a one-time or otherwise infrequent process without high capability of dynamic reconfiguring LSPs and the LSRs' related forwarding mechanisms. Such programming can be referenced as "static provisioning" or "static provisioned" LSPs. An MPLS network providing only static provisioned LSPs can have limitations that may be undesirable for some applications.

To avoid such limitations, an MPLS network can be provided with capability of dynamic provisioning the LSPs and the forwarding mechanisms. One known conventional technique to provide for dynamic provisioning of MPLS LSPs and forwarding mechanisms is to provide a control plane. For brevity, the term "control plane" will mean, except where expressly stated otherwise, or made clear from its context to have a different meaning, a control plane capable of dynamical provisioning of LSPs and the LSRs forwarding mechanisms. Known conventional techniques for providing a control plane for MPLS networks, though, require LSRs to be assigned a unique internet protocol (IP) address, and therefore do not enable dynamic provisioned LSPs in an "IP addressless" environment. There are known, conventional MPLS control plane techniques that can run on LSRs that interface without IP addresses, also referred to as "IP Unnumbered interfaces." However, known conventional MPLS control plane techniques running on IP Unnumbered interfaces can require a unique IP address as a TE node address (also referred as Loopback Address) and, therefore, are not "IP addressless."

MPLS-TP is a profile of MPLS, comprising a subset of the MPLS protocol suite, e.g., certain MPLS functions disabled or omitted, with certain additions or extensions, generally to meet transport network requirements. As known to persons of ordinary skill in the art, MPLS-TP can be carried over physical transport technologies, for example, SONET/SDH, OTN/WDM, and Gigabit Ethernet.

MPLS-TP networks are required, under current industry-recognized MPLS-TP specifications, to function with LSRs that are IP-addressable and support IP addressing, and with LSRs not IP addressable and that do not support IP addressing. However, for dynamic provisioning of LSPs and the LSRs' corresponding packet forwarding mechanisms, MPLS-TP carries the MPLS shortcoming of requiring the LSRs/LERs support IP addressing. There are known conventional techniques for static provisioning of LSPs and LSR forwarding mechanisms in an MPLS-TP network, without violating the MPLS-TP specification of functioning with or without IP addressing. Such known conventional techniques utilize, for example, the MPLS-TP management plane. These known conventional techniques can adhere to the MPLS-TP specification of not requiring LSRs that support IP addressing. However, the limitation to static provisioning may be unacceptable, or not preferred for some applications.

There are known conventional techniques for supplementing MPLS-TP networks with a control plane that can provide dynamic provisioning of LSPs, and of multi-segment pseudo-wires (PWs). However, as with techniques providing a dynamic provisioning control plane for MPLS networks, such techniques require the LSRs and LERs of the supplemented MPLS-TP network to support IP addressing. Therefore, conventional techniques for dynamically provisioning LSPs and LSR forwarding mechanisms in an MPLS-TP network result in an MPLS network that, even though providing MPLS-TP transport of traffic, does comply with the currently recognized MPLS-TP specifications.

In addition, although known conventional techniques can supplement MPLS-TP networks with a non-specification control plane providing dynamical provisioning of LSPs and associated LSR forwarding mechanisms, such techniques do not readily enable separation of the client layer control plane from the server layer control plane.

SUMMARY

MPLS-TP network methods and systems according to various embodiments can include, in an aspect, at least one in-band control plane providing, among other features, dynamic tunnel management and signaling and dynamic PW management and signaling including, for example, dynamic, traffic engineered provisioning and tear-down of MPLS-TP tunnels and PWs, without requiring the MPLS-TP network, or its LSRs have IP addressing or support IP forwarding.

MPLS-TP network systems and methods according to various embodiments can provide, in addition, multiple concurrent in-band control planes, independent from one another, each providing dynamic provisioning of LSPs and multi-segment PWs, for concurrent traffic-engineered transport of packets communicated by multiple concurrently running applications.

It will be understood that the phrase "dynamic tunnel management and signaling," as used henceforth in this disclosure, means "dynamic tunnel management and signaling and/or dynamic PW management and signaling," except where explicitly stated otherwise or where made clear from a particular context to have a different meaning.

In an aspect, one method of MPLS-TP networking in accordance with various embodiments can include, in an example environment of label switching nodes that interface to a data plane, generating dynamic tunnel management and signaling control plane protocol messages and encapsulating the dynamic tunnel management and signaling control plane protocol messages in data plane encapsulating packets, structured according to a given data plane protocol, and communicating the data plane protocol encapsulating packet, through a data plane channel in the data plane, to a destination label switching node, in combination with extracting, at the destination label switching node, at least a portion of the dynamic tunnel management and signaling control plane message from the data plane protocol encapsulating packet, in further combination with performing, at the destination label switching node, a dynamic tunnel and/or PW management process based at least in part on the extracted at least a portion of the dynamic tunnel management and signaling control plane protocol message.

In an aspect, data plane protocol encapsulating packets, encapsulating dynamic tunnel management and signaling control plane protocol messages for in-band control planes in accordance with various exemplary embodiments can include an identifying structure, for example a specific header unique to data plane protocol encapsulating packets.

In a further aspect, data plane protocol encapsulating packets, encapsulating dynamic tunnel management and signaling control plane protocol messages for in-band control planes in accordance with various exemplary embodiments, can include a field identifying a message type of its encapsulated dynamic tunnel management and signaling control plane protocol message. In a further aspect, the field identifying the message type of the encapsulated dynamic tunnel management and signaling control plane protocol message can include a Type-Length-Value (TLV) object that can indicate one among a given plurality of protocols.

In another aspect, data plane protocol encapsulating packets, encapsulating dynamic tunnel management and signaling control plane protocol messages for in-band control planes in accordance with various exemplary embodiments, can include a multi-instance identifier field having a multi-instance identifier object identifying a specific control plane instance in a given multi-instance control plane environment.

In an aspect, one method of MPLS-TP networking in accordance with various embodiments can include, in an example environment of label switching nodes that interface to a data plane, generating a dynamic tunnel management and signaling control plane protocol message having path parameters defining a label switched path (LSP) in the data plane. In a further aspect, one method can include encapsulating the dynamic tunnel management and signaling control plane protocol message in a data plane protocol encapsulating packet, combined with communicating the data plane protocol encapsulating packet, through a given channel in the data plane.

In an aspect, MPLS-TP switching apparatus according to various exemplary embodiments can include an MPLS-TP Generic Associated Channel (G-ACH) interface to an incoming or received G-ACH, provided in a link connected to the MPLS-TP switching apparatus, and a packet detection module. In an aspect, the packet detection module can be configured to detect receipt at the MPLS-TP G-ACH interface of a data plane protocol encapsulating packet that encapsulates a dynamic tunnel management and signaling control plane protocol message. In an aspect, an extraction module may be coupled to the MPLS-TP G-ACH interface, or to the packet detection module, or both, and can be configured to extract at least a portion of the encapsulated dynamic tunnel management and signaling control plane protocol message, and to provide the extracted portion to a control plane processing module. The control plane processing module can be configured to perform dynamic tunnel management and signaling processes in accordance with the extracted portion of the dynamic tunnel and/or PW management control plane protocol message. In an aspect, an encapsulating module can be configured to encapsulate, in an outgoing data plane protocol encapsulating packet, a result of a dynamic tunnel management and signaling process performed by the control plane processing module, and can provide the outgoing data plane protocol encapsulating packet to the MPLS-TP G-ACH interface for sending, though an outgoing G-ACH, to a neighbor MPLS-TP switching apparatus.

As will be appreciated by persons of ordinary skill in the MPLE-TP network arts upon reading this disclosure, MPLS-TP network methods and systems according to various exemplary embodiments can provide features and benefits that can include, without limitation, efficient interoperability with known, conventional MPLS-TP network techniques. Other aspects and advantages associated with the embodiments disclosed herein will become apparent to those skilled in the art based on the accompanying drawings and detailed description.

BRIEF DESCRIPTION OF THE DRAWINGS

The accompanying drawings are presented to aid in the description of the embodiments disclosed herein and are provided solely to illustrate exemplary features associated with the disclosed embodiments without defining any limitations thereof.

DETAILED DESCRIPTION

Figure 1:
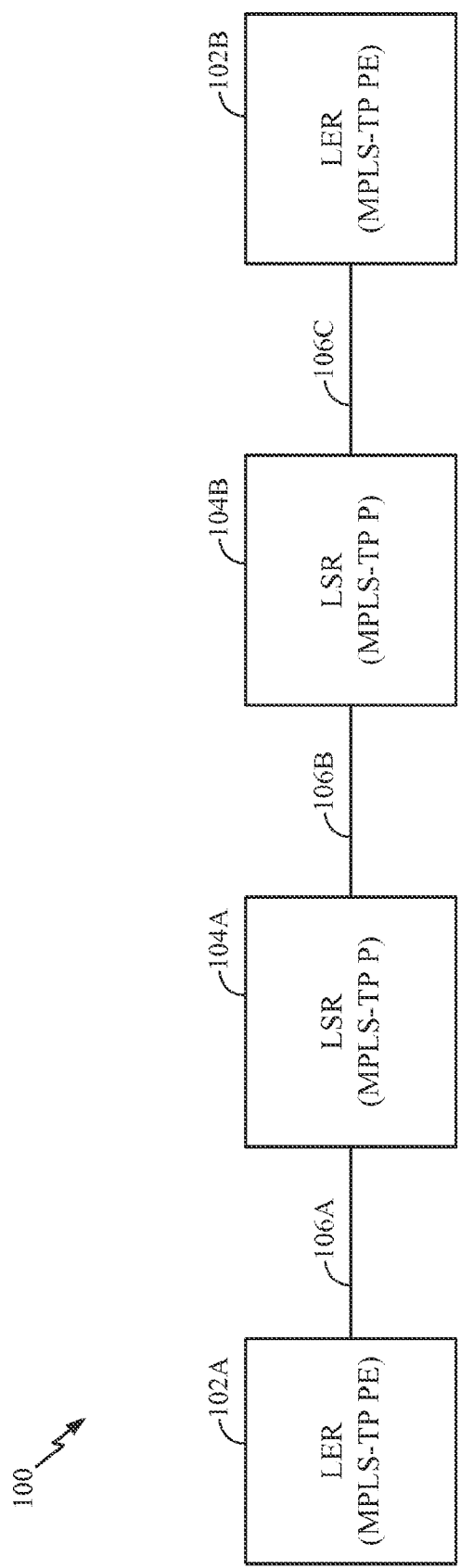
FIG. 1 shows one example high-level functional block diagram of one MPLS-TP network for supporting, and providing traffic engineered transport associated with one or more dynamic tunnel and PW management (DTPM) in-band control planes of MPLS-TP network systems and methods in accordance with various exemplary embodiments.

Aspects are disclosed in the following description and related drawings to show specific examples relating to various exemplary embodiments relating to technique. However, alternate embodiments will be apparent to those skilled in the pertinent art upon reading this disclosure, and may be constructed and practiced without departing from the scope or spirit of the disclosure. Additionally, well-known elements will not be described in detail or may be omitted, to avoid obscuring relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, discussion of a feature, advantage or mode of operation in reference to "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Table 1 lists Internet Engineering Task Force (IETF) Request for Comment (RFC) documents that may relate to one or more aspects of various exemplary embodiments.

TABLE 1

| | |
|---|---|
| RFC 3209 | RSVP-TE: Extensions to RSVP for LSP Tunnels |
| RFC 3270 | Multi-Protocol Label Switching (MPLS) Support of Differentiated Services |
| RFC 3471 | Generalized Multi-Protocol Label Switching (GMPLS) Signaling Functional Description. |
| RFC 3473 | Generalized Multi-Protocol Label Switching (GMPLS) Signaling Resource Reservation Protocol-Traffic Engineering (RSVP-TE) Extensions |
| RFC 3564 | Requirements for Support of Differentiated Services-aware MPLS Traffic Engineering |
| RFC 3985 | Pseudo Wire Emulation Edge to Edge (PWE3) Architecture |
| RFC 3945 | Generalized Multi-Protocol Label Switching (GMPLS) Architecture |
| RFC 4124 | Protocol Extensions for Support of Diffserv-aware MPLS Traffic Engineering. |
| RFC 4202 | Routing Extensions in Support of Generalized Multi-Protocol Label Switching (GMPLS) |
| RFC 4203 | OSPF Extensions in Support of Generalized Multi-Protocol Label Switching (GMPLS) |
| RFC 4206 | Label Switched Paths (LSP) Hierarchy with Generalized Multi-Protocol Label Switching GMPLS) Traffic Engineering (TE) |
| RFC 4426 | Generalized Multi-Protocol Label Switching (GMPLS) Recovery Functional Specification |
| RFC 4726 | A Framework for Inter-Domain Multiprotocol Label Switching Traffic Engineering |
| RFC 4762 | Virtual Private LAN service (VPLS) using Label Distribution Protocol (LDP) signaling |
| RFC 4872 | RSVP-TE Extensions in Support of End-to-End Generalized Multi-Protocol Label Switching (GMPLS) Recovery |
| RFC 4873 | GMPLS Segment Recovery |
| RFC 5150 | Label Switched Path Stitching with Generalized Multiprotocol Label Switching Traffic Engineering (GMPLS TE) |
| RFC 5151 | Inter-Domain MPLS and GMPLS Traffic Engineering - Resource Reservation Protocol-Traffic Engineering (RSVP-TE) Extensions |
| RFC 5305 | IS-IS Extensions for Traffic Engineering |
| RFC 5307 | IS-IS Extensions in Support of Generalized Multi-Protocol Label Switching (GMPLS). |
| RFC 5586 | MPLS Generic Associated Channel |
| RFC 5654 | Requirements of an MPLS Transport Profile |
| RFC 5659 | An Architecture for Multi-Segment Pseudowire Emulation Edge-to-Edge |
| RFC 5921 | A Framework for MPLS in Transport Networks |
| RFC 5960 | MPLS Transport Profile Data Plane Architecture |
| RFC 6073 | Segmented Pseudowire |
| RFC 6107 | Procedures for Dynamically Signaled Hierarchical Label Switched Paths |
| RFC 6370 | MPLS Transport Profile (MPLS-TP) Identifier |
| RFC 6372 | MPLS Transport Profile (MPLS-TP) Survivability Framework |
| RFC 6373 | MPLS Transport Profile (MPLS-TP) Control Plane Framework |

Various exemplary embodiments provide an MPLS-TP network with one or more dynamic tunnel and/or PW management control planes within an MPLS-TP data plane channel, which can provide MPLS-TP networks with, among other features, dynamic tunnel and/or PW management functionalities including, for example, dynamic provisioning and tear-down of MPLS-TP tunnels and/or PWs, for traffic engineered transport, without IP addressing requirements of known, conventional techniques that supplement MPLS-TP networks with a control plane that is apart from the MPLS-TP data plane and IP address dependent.

For brevity, terminology useful for describing concepts, aspects, and example operations, and abbreviated forms of such terminology, will now be defined. It will be understood that the terminology, and the abbreviated forms, are intended only for convenience by having internal consistency in terminology, and are not intended as any limitation to the scope of any exemplary embodiments, or any aspect thereof. On the contrary, as will be appreciated by persons of ordinary skill in the art upon reading this disclosure, various alternative terminologies may be devised for describing the disclosed concepts, aspects and example operations.

The phrase "in-band," as used in this disclosure, means extant or supported within an MPLS-TP data plane channel, with associated packets exchanged having an outer or external packet structure according to MPLS-TP data plane protocol.

The phrase "out-of-band," as used in this disclosure, means extant or supported within a channel or plane apart from the MPLS-TP data plane.

For brevity, subsequent instances in this disclosure of the phrase "dynamic tunnel and/or PW management" are recited in abbreviated form as "DTPM." It will be understood that the abbreviated form, "DTPM," has no meaning in this disclosure except being an abbreviated form of "dynamic tunnel and/or PW management dynamic."

For brevity, subsequent instances in this disclosure of the phrase: "data plane protocol encapsulating packet" are recited in abbreviated form as: "DPE packet." It will be understood that "DPE packet" has no meaning in this disclosure except being an abbreviated form of: "data plane protocol encapsulating packet."

Similarly, for brevity, subsequent instances in this disclosure of the phrase: "DPE packet encapsulating one or more DTPM messages" are recited in abbreviated form as: "DPE/DTPM packet." It will be understood that "DPE/DTPM packet" has no meaning in this disclosure except being an abbreviated form of: "DPE packet encapsulating one or more DTPM messages."

The term "LS," as used in this disclosure, is an abbreviated form of "label switched."

The term "label switch node," and its abbreviated form "LSN," as used in this disclosure, are a collective reference to LSRs and LERs.

LSNs in MPLS-TP systems and methods in accordance with various exemplary embodiments can include known conventional MPLS-TP LS packet transport functionalities, for example, interfacing to a data plane, receiving MPLS-TP data plane protocol packets, associating such packets with provisioned LSPs and tunnels, and forwarding the packets through the associated provisioned tunnel. In an aspect, LSNs in MPLS-TP systems and methods in accordance with various exemplary embodiments can implement such known conventional MPLS-TP LS packet transport functionalities using known, conventional resources for MPLS-TP packet transport.

In an aspect, MPLS-TP network methods and systems in accordance with various exemplary embodiments can provide one or more DTPM in-band control planes by generating DTPM messages according to a control plane protocol, encapsulating the DTPM messages in DPE/DTPM packets, and forwarding the DPE/DTPM packets through one or more default or assigned MPLS-TP data plane channels to destination LNRs. In a related aspect, MPLS-TP network methods and systems in accordance with various exemplary embodiments can include, at destination LNRs, resources and methods of extracting DTPM messages from received DPE/DTPM packets, pulling the extracted DTPM messages into a control plane processing resource in the LNR, and performing DTPM processes in accordance with extracted DTPM message. As will be appreciated by persons of ordinary skill in the MPLS-TP arts upon reading the present disclosure, DTPM processes performed in accordance with DTMP messages received in-band in accordance with exemplary embodiments can include, for example dynamic tunnel provisioning and tear-down processes that, in known conventional MPLS-TP network techniques, require a supplementary non-MPLS-TP IP-based control plane.

In a further aspect, MPLS-TP network systems and methods in accordance with various embodiments can provide DPE/DTPM packets, for exchange in-band, that can include a Type-Length-Value (TLV) or equivalent object, and the TLV or equivalent object that can indicate or identify a control plane protocol of the DTPM message. In a further aspect, the TLV or equivalent object can be configure to indicate or identify a control plane protocol of the DTPM message among a given plurality of dynamic tunnel or PW management protocols, as described in greater detail at later sections.

In another aspect, MPLS-TP network systems and methods in accordance with various embodiments can provide DPE/DTPM packets for exchange in-band and that can include a multi-instance identifier field having, for example, a multi-instance identifier object identifying a specific control plane instance in a given multi-instance control plane environment, as described in greater detail at later sections.

In an aspect, MPLS-TP network methods and systems in accordance with various exemplary embodiments can provide one or more DTPM in-band control planes by enabling extended functionalities of the MPLS-TP G-ACH. Methods and systems extending functionalities of the MPLS-TP G-ACH can include various DPE/DTPM packet structures including a G-ACH header, and one or more DTMP field extensions of the GAP protocol, described in greater detail at later sections.

In description of MPLS-TP network methods and systems in accordance with various exemplary embodiments, providing DTPM in-band control planes using extensions of G-ACH and GAP protocol, there will be a number of instances of the phrase "MPLS-TP DTPM in-band control plane employing the G-ACH. Such description will also have a number of instances of the phrase "MPLS-TP DPE/DTPM packet structures according to the G-ACH protocol, including DTPM extensions of the GAP protocol."

For brevity, the phrase "MPLS-TP DTPM in-band control plane employing the G-ACH" will be recited in abbreviated form as "GC-DTPM in-band control plane," and the phrase "MPLS-TP DPE/DTPM packet structured according to G-ACH protocol, including DTPM extensions of the GAP protocol," will be recited in abbreviated form as "GP-DPE/DTPM packet." It will be understood that "GC-DTPM in-band control plane" has no meaning in this disclosure except being an abbreviated form of: "MPLS-TP in-band DTPM control plane employing the G-ACH," which is an abbreviated form of "MPLS-TP in-band, dynamic tunnel and/or PW management control plane, employing the G-ACH." Likewise, it will be understood that "GP-DPE/DTPM packet" has no meaning in this disclosure except its being an abbreviated form of: "MPLS-TP DPE/DTPM packet having structure including DTPM extensions of the GAP protocol," which is an abbreviated form of "MPLS-TP data plane protocol encapsulated, dynamic tunnel and/or PW management control plane protocol packet, having structure including dynamic tunnel and/or PW management extensions of the GAP protocol."

It will be understood that description of aspects and example operations in reference to GC-DTPM control planes does not limit practices according to the exemplary embodiments to in-band exchange of DTPM messages that are through the G-ACH. On the contrary, this disclosure contemplates practices of the inventive concepts using other, or additional dedicated data plane channels, of similar kind, that may be established in the future.

FIG. 1 shows one example high-level functional block diagram of one MPLS-TP network 100 that can be configured, as described in greater detail at later sections, to provide GC-DTPM control planes, i.e., in-band management of traffic engineered transport in accordance with various exemplary embodiments. The MPLS-TP network 100 includes a representative set of, for example, two MPLS label edge routers (LERs), labeled individually as 102A and 102B, and two MPLS label switched routers (LSRs) labeled individually as 104A and 104B. The LERs 102A and 102B are also referenced generically in this description as "an LER 102" (a label not explicitly in FIG. 1) and collectively as "the LERs 102." The LSRs 104A and 104B are also referenced generically in this description as "an LSR 104" (a label not explicitly in FIG. 1), and collectively as "the LSRs 102." It will be understood that the FIG. 1 quantity of two LSRs 104 between the two LERs 102, and the example in-line topology of the LSRs 104, are only for purposes of a simple example environment for describing example operations illustrating concepts, and are not intended as any limitation on the scope of any embodiments.

Referring to FIG. 1, the MPLS-TP network 100 includes an arrangement of data plane links, (hereinafter referred to as "links"), referenced individually as "link 106A," "link 106B," and "link 106C" connecting the LERs 102 and LSRs 104 as shown. The links 106A, 106B and/or 106C are also referenced in this disclosure, generically, as "a link 106" and, collectively, as "links 106." The links 106 can be implemented in accordance with known, conventional MPLS-TP data plane link techniques. In addition, each of the links 106 can be configured, in accordance with known conventional MPLS-TP techniques, to support one or more tunnels (not explicitly shown) for transporting traffic in accordance with MPLS-TP specifications.

Continuing to refer to FIG. 1, the LER 102A and 102B in the MPLS-TP network 100 can be endpoints for multi-segment LSPs (not separately shown) that extend, hop-by-hop, through the LSRs 104, and therefore can provide MPLS-TP Provider Edge (PE) router functionality for interfacing with client networks (not shown in FIG. 1). In describing operations in relation to FIG. 1, the LER 102A and LER 102B will be therefore be referenced alternatively as the "MPLS-TP PE router 102A" and the "MPLS-TP PE router 102B," respectively. The LERs 102A and 102B, further to their respective configurations as MPLS-TP PE routers 102A and 102B, respectively, can push or pop the LSP label (not shown in FIG. 1) of packets entering and leaving the MPLS-TP network 100. Conventional techniques, not specific to the disclosed embodiments, for push and pop of the LSP labels can be used. Such techniques are known to persons of ordinary skill, and therefore further detailed description is omitted. Likewise, the LSRs 104A and 104B can function as MPLS-TP P routers for provisioning, for example, multi-segment LSPs, as described in greater detail later in this disclosure, between the LERs 102A and 102B. LSRs 104A and 104B are therefore alternatively referenced hereinafter in this disclosure as the "MPLS-TP P router 104A" and the "MPLS-TP P router 104B," respectively.

Referring to FIG. 1, it will be understood that the terms "MPLS-TP PE router," "MPLS-TP P router," "LSR" and "LER," in description of roles of the LERs 102 and LSRs 104 in the MPLS-TP network 100, will be understood to mean logical functions with respect to a given LSP (not separately shown in FIG. 1). Therefore, in MPLS-TP networks having a topology according to the MPLS-TP network 100, one MPLS-TP network node device (not specifically shown in FIG. 1) may perform as an LER, i.e., endpoint, with respect to one multi-segment LSP (not specifically shown in FIG. 1), and as an LSR, i.e., an intervening MPLS-TP router, with respect to another multi-segment LSP (not specifically shown in FIG. 1).

Referring to FIG. 1, in accordance with various exemplary embodiments one or both of the LSRs 104 can be configured to provide various DTPM functionalities, e.g., dynamic tunnel and PW management, associated with certain DTMP messages that can be encapsulated in GP-DPE/DTPM packets that the LSRs 104 can receive, via in-band communications from a neighbor LSR 102 or LER 104, through a default G-ACH (not specifically shown) in a link 106. Example types of DTMP messages encapsulated in GP-DPE/DTPM packets and examples of associated dynamic tunnel and or PW management functionalities are described in greater detail at later sections.

In an aspect, the LSRs 104 can comprise resources (not shown in FIG. 1) for recognizing, for example from certain packet header information (not shown in FIG. 1), that a data packet received on a G-ACH is a GP-DPE/DTPM packet. LSRs 104 can further include resources (not shown in FIG. 1) for determining, for example, from further packet header information of the GP-DPE/DTPM packet, whether the LSR 102 is a target or destination LSR for that GP-DPE/DTPM packet. In a related aspect, LSRs 104 can include resources (not shown in FIG. 1) for determining that a GP-DPE/DTPM packet is for a different destination LSR 104, or for an LER 102. In further related aspect, LSRs 104 can include resources (not shown in FIG. 1) for forwarding such DTMR message packets, in-band through the G-ACH of an appropriate link 106, to an appropriate neighbor LSR 104 for communication to that destination LSR 104 or LER 102.

In an aspect, LSRs 104 and LERs 102 in the MPLS-TP network 100 can comprise resources (not shown) in FIG. 1 for un-encapsulating received GP-DPE/DTPM packets, for which the LSR 104 or LER 102 is the destination, and extracting the DTPM message content. In a further aspect, LERs 102 and LSRs 104 in the MPLS-TP network 100 can comprise resources (not shown in FIG. 1) for pulling the extracted DTPM message content into a control plane processing resource (not shown in FIG. 1) internal to the LSR 104 or LER 102. In another aspect, LERs 102 and LSRs 104 in accordance with exemplary embodiments can further comprise resources (not shown in FIG. 1) for encapsulating results of the LSR's or LER's internal control plane processing into outgoing GP-DPE/DTPM packets, and communicating the outgoing packets, in-band, through the G-ACH of an appropriate link 106 to a neighbor LSR 104 for forwarding to a desired destination, i.e., a specific LSR 104 or LER 102.

Referring to FIG. 1, in one aspect, the MPLS-TP PE router 102A can be configured to receive information, from MPLS-P router 104A, by DPE/DTPM packet communicated through a G-ACH in the link 106A, for updating a database (not shown in FIG. 1) of topology information. The database of topology information can identify, for example, the MPLS-TP P routers 104A and 104B, the other MPLS-TP PE router 102B, and each of the links 106A, 106B and 106C. For brevity, GP-DPE/DTPM packets carrying topology information can be referred to as "GP-DPE/DTPM topology reporting packets." In an aspect, the GP-DPE/DTPM topology reporting packets can be a type, or can be among a group of types, from among a larger plurality of types of GP-DPE/DTPM packets that can be generated and communicated. Examples of types of GP-DPE/DTPM packets that may be generated and communicated, in-band, in accordance with various exemplary embodiments are described in greater detail later in this disclosure.

Continuing to refer to FIG. 1, the MPLS-TP PE router 102A can be configured to update and maintain the database of topology information, based on relevant information extracted from GP-DPE/DTPM topology reporting packets received from the MPLS-TP P router 104A, in accordance with known conventional supplemental IP address dependent control plane techniques. Therefore, further detailed description of particular technique(s) that can be used for such updating and maintaining of a database of topology information will be omitted.

In an aspect, the MPLS-TP PE router 102A can be configured to perform, in its functionality as an ingress LER node, computation of a multi-segment path or LSP (not explicitly shown in FIG. 1) to an egress edge node of the MPLS-TP network 100, for example, the MPLS-TP PE router 102B. The configuration of the MPLS-TP PE router 102A, in an aspect, include the capability of computing a node-by-node explicit path layout using, for example, conventional constrained shortest path first (CSPF) application techniques. In a related aspect, path computation resources of the MPLS-TP PE router 102A can be configured to generate, based on a result of, for example, a CSPF application, a content (not specifically shown in FIG. 1) for encapsulating in a DPE/DPTM packet, the content defining an explicit path, for example, comparable to a known, conventional RSVP PATH message. Example implementations are described in greater detail in later sections of this disclosure.

Referring to FIG. 1, in a related aspect, LSRs 104 such as the MPLE-TP P routers 104A and 104B can be configured to include a capability of link resource inventory processes in accordance with known, conventional link resource inventory techniques. As will be appreciated by persons of ordinary skill in the art from reading this disclosure in its entirety, practices according to the embodiments that include link resource inventory processes in accordance with known, conventional link inventory techniques shows one example of the embodiment's benefit of low cost implementation through adaption of known techniques.

In a further aspect, MPLS-TP P routers 104A and 104B can be configured include intervening LSRs functionality of generating, based on a result of their link resource inventory processes, a content (not shown in FIG. 1) for a link resource advertisement message (not shown in FIG. 1), for encapsulation in a DPE/DTPM packet and in-band communication, to a neighbor MPLS-TP P router 104 or neighbor MPLE-TP PE router 102A or 102B. DPE/DTPM packets carrying link resource advertisement messages can be comparable, in terms of information and scope of recipients, to known, conventional link resource advertisements (not shown in FIG. 1) generated by LSRs (not shown in FIG. 1) for advertisement through a known, conventional IP-based control plane (not shown in FIG. 1) supplementing a conventional MPLS-TP network (not separately shown in FIG. 1).

As previously stated in this disclosure, GP-DPE/DTPM packets within the GC-DTPM in-band control plane can be structured with a G-ACH header and with DTPM extensions of the G-ACH Advertisement Protocol" (GAP). Conventional specifications and functionalities of the GAP protocol in conventional MPLS-TP networks are known, or readily referenced, by persons of ordinary skill. Therefore, reproduction in this disclosure of such conventional specifications and functionalities is not necessary for such persons to understand concepts of this disclosure, and to readily implement, for example, extensions of GAP for practicing in accordance with the described embodiments.

For example, known, conventional GAP protocol can carry certain application specific information over the G-ACH of an LSP such as a tunnel, pseudo-wire or a section from one end-point to the other in a conventional MPLS-TP network. As known to persons of ordinary skill, the known, conventional GAP protocol uses a message format that comprises a fixed header followed by a GAP payload. The known, conventional GAP payload contains one or more application level data block elements (ALDBE). An ALDBE contains an application identifier (AID), a lifetime, and zero or more Type-Length-Value (TLV) objects to describe application specific information. Known, conventional GAP protocol, with its ALDBE and TLV object specifications, though, does not provide or support dynamic tunnel and/or PW management, e.g., doers not provide dynamic provisioning and tear-down of tunnels or PWs.

MPLS-TP in-band control planes in accordance with various exemplary embodiments, though, can include extensions and modifications of the conventional GAP protocol and, in combination with various aspects of the in-band control plane's GP-DPE/DTPM packets, can provide, among other features and benefits, DTPM functionality in MPLS-TP networks, e.g., dynamic provisioning and tear-down of tunnels or PWs.

Figure 2:
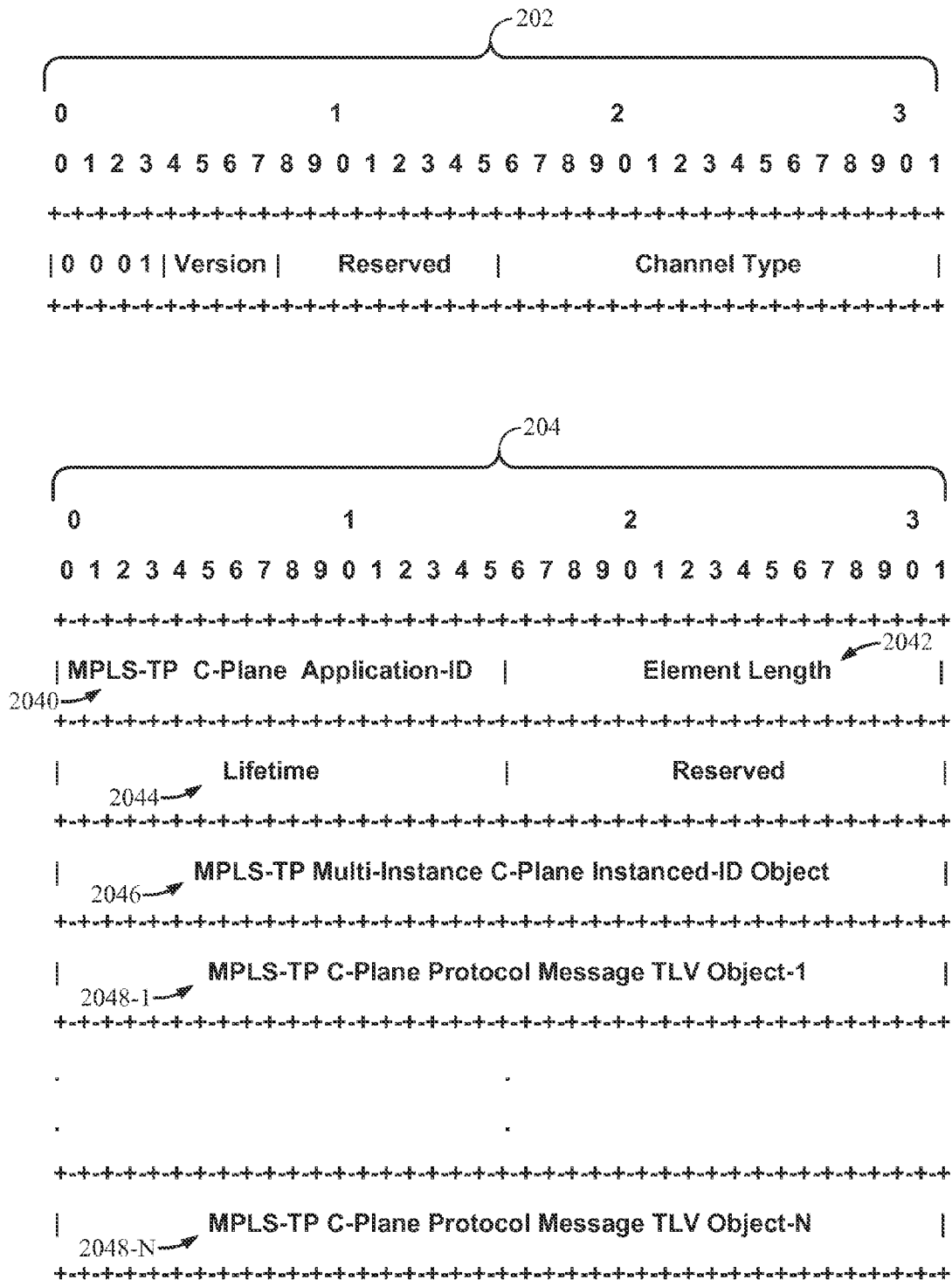
FIG. 2 shows one example G-ACH packet format or structure for GP-DPE/DTPM packets for exchange within one or more GC-DTPM in-band control planes carried by MPLS-TP G-ACH channels of MPLS-TP network systems and methods in accordance with various exemplary embodiments.

FIG. 2 shows one example G-ACH packet structure or G-ACH packet format 200 for GP-DPE/DTPM packets for exchange within one or more GC-DTPM in-band control planes carried by MPLS-TP G-ACH channels within the links 106, in accordance with one or more exemplary embodiments. Referring to FIGS. 1 and 2 together, in an aspect the FIG. 1 LSRs 102 can be configured to receive GP-DPE/DTPM packets according to the G-ACH packet format 200, through the G-ACH in a link 106 connected to the LSR 102, and detect the packet as a GP-DPE/DTPM packet. In a related aspect, each of the LSRs 102 can be configured to generate and communicate through a G-ACH of a connected link 104, a GP-DPE/DTPM packet having the G-ACH packet format 200.

Referring to FIG. 2, it will be understood that the G-ACH packet format 200 can comprise extensions of the GAP protocol, non-limiting examples of which are described in greater detail later in this disclosure. As one illustration, the G-ACH packet format 200 can include a G-ACH header 202 and a DTPM message field 204 that, for example, can be an extended ADBE field. In an aspect, the DTPM message field 204 can comprise a GC-DTPM in-band control plane application ID 2040, along with an element length 2042, a lifetime 2044, a multi-instance GC-DTPM in-band Control Plane Instance-ID object 2046, and a type-length-value (TLV) object 2048. The GC-DTPM in-band control plane application ID 2040 can be, for example, a GAP protocol MPLS-TP C-Plane Application-ID. The length of the GC-DTPM in-band control plane application ID 2040 can be, for example, 16 bits. It will be understood that 16 bits is only for purposes of example, and is not intended to limit practices according to any of the exemplary embodiments to using a 16-bit GC-DTPM in-band control plane application ID 2040.

Continuing to refer to FIG. 2, according to one aspect, the GC-DTPM in-band control plane application ID can associate the GP-DPE/DTPM packet according to the G-ACH packet format 200 with a particular GC-/DTPM in-band control plane in accordance with one or more exemplary embodiments. In an aspect, the element length 2042 can contain a value representing the total length of the DTPM message field 204, e.g., the extended ALDBE field implementation of the DTPM message field 204, including the element length 2042. The length of the element length 2042 can be, for example, 16 bits. It will be understood that 16 bits is only for purposes of example, and is not intended to limit practices according to any of the exemplary embodiments to using a 16-bit element length 2042. The lifetime 2044 can indicate a duration, for example, in seconds specified by the message sender, that a receiver (e.g., one of the FIG. 1 LSRs 102) of the GP-DPE/DTPM packet having that lifetime 2044 should retain the data of the extended DTPM message field 204 (e.g., data of the ALDBE field) as valid. The length of the lifetime 2044 can be, for example, 16 bits. It will be understood that 16 bits is only for purposes of example, and is not intended to limit practices according to any of the exemplary embodiments to using a 16-bit lifetime 2044.

Referring still to FIG. 2, in one aspect, the GC-DTPM in-band multi-instance Control Plane Instance ID object 2046 can be an encoded object containing the instance identifier of the specific in-band control plane instance, in a multi-instance control plane environment, that is sending the message having that GC-DTPM in-band multi-instance-ID object 2046. In a further aspect, the MPLS-TP GC-DTPM in-band control plane protocol message TLV Object 2048 can be a GC-DTPM in-band control plane application specific protocol message that is encoded in a Type-Length-Value format while sending.

As previously described in this disclosure, in an aspect, one or more DTPM and related control plane protocols can run in the one or more GC-DTPM in-band control planes, and the GP-DPE/DTPM packets exchanged can have, among GAP extensions in accordance with various exemplary embodiments, a unique GC-DTPM in-band control plane application ID 2040 assigning the packet to a particular one of the one or more GC-DTPM in-band control planes. It will therefore be understood by persons of ordinary skill, from reading this entire disclosure, that facilitation of certain implementations may be assisted, at the user's option, through performing a non-technical regulatory compliance step of applying for a listing, in the LANA registry, of one or more unique GC-DTPM in-band control plane application IDs 2040. Illustrative GC-DTPM control plane application IDs 2040 can, but do not necessarily include, and are not limited to, a unique GC-DTPM in-band control plane application ID 2040 for RSVP-TE signaling protocol in constructing MPLS & GMPLS tunnels. One example unique GC-DTPM in-band control plane application ID 2040 for RSVP-TE signaling protocol will be arbitrarily named, for convenient reference in later sections of this disclosure, as "RSVP-TE signaling protocol ID." Other illustrative GC-DTPM control plane application IDs 2040 can include one or more of the GC-DTPM control plane application IDs 2040 listed in Table 2 below.

TABLE 2

Figure 3:
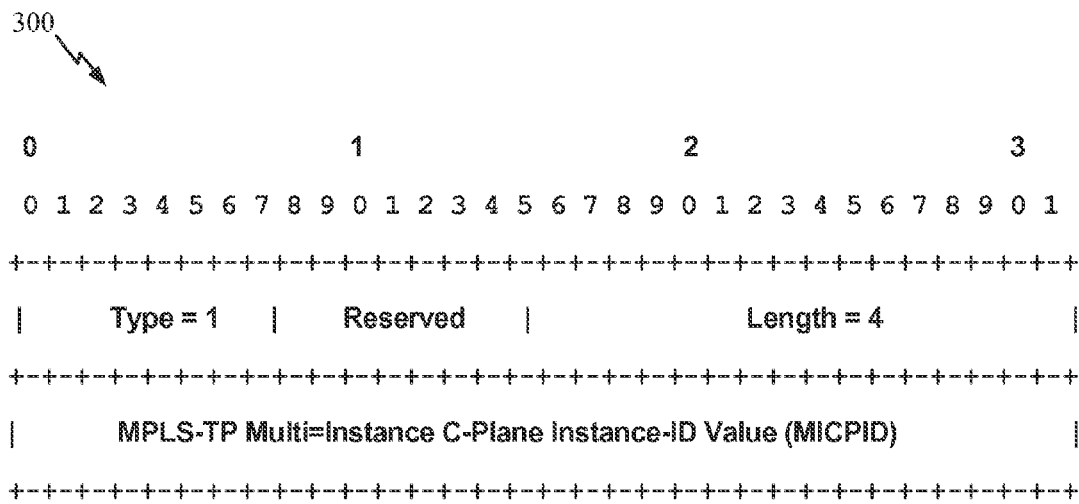
FIG. 3 shows one example packet format or structure for one GP-DPE/DTPM packet, for GC-DTPM in-band control plane communications through one or more GC-DTPM control planes within MPLS-TP network systems and methods in accordance with one or more exemplary embodiments.

GMPLS Link Management Protocol (LMP) ID
OSPF Routing protocol ID, with      OSPF-TE extension ID
                                    GMPLS-OSPF-TE extension ID
ISIS Routing protocol ID, with      ISIS-TE extension ID
                                    GMPLS-ISIS-TE extension ID
LDP signaling protocol ID, with PW management extension IDs FIG. 3 shows one example packet format 300 for one GP-DPE/DTPM packet, for GC-DTPM in-band control plane communications through one or more GC-DTPM control planes within MPLS-TP network systems and methods in accordance with one or more exemplary embodiments.

Figure 4:
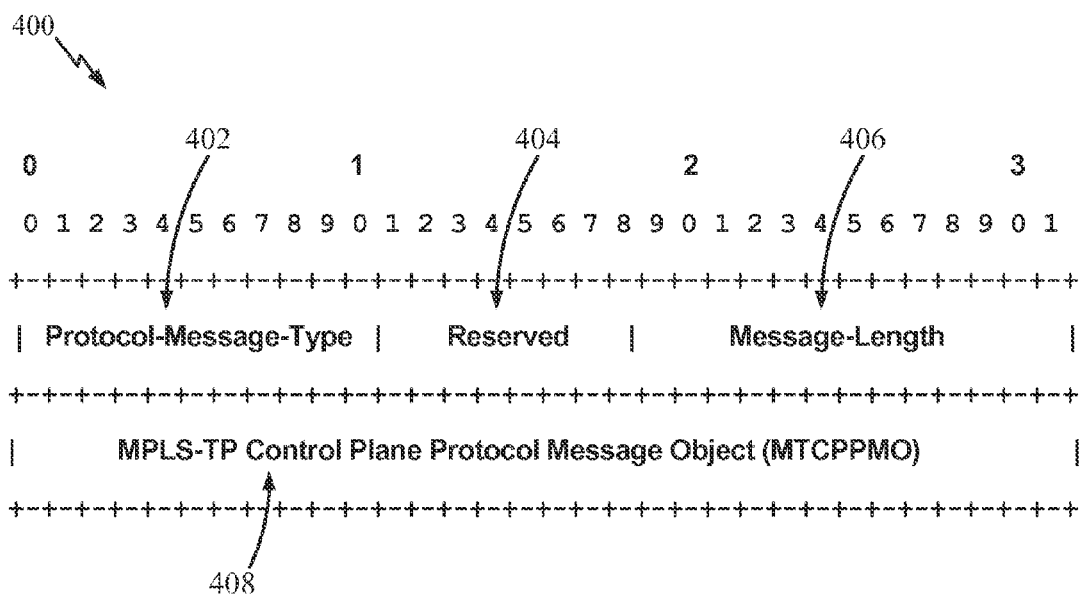
FIG. 4 shows one example shows one example GC-DTPM in-band control plane Type-Length-Value (TLV) Object structure or format for use in one GP-DPE/DTPM packet for in-band communication through one or more GC-DTPM in-band control planes within MPLS-TP network systems and methods in accordance with various exemplary embodiments.

FIG. 4 shows one example GC-DTPM in-band control plane TLV Object structure 400 for use in one GP-DPE/DTPM packet for in-band communication through one or more GC-DTPM in-band control planes within MPLS-TP network systems and methods in accordance with various exemplary embodiments. As will be appreciated by persons of ordinary skill upon reading this disclosure, GC-DTPM in-band control plane TLV Object structure 400 can provide a generic message encoding structure capable of carrying, encapsulated as a data plane packet having a G-ACH header, various DTPM control messages related, for example, to dynamic tunnel and/or PW provisioning and tear-down, which are functionalities that, in known, conventional MPLS-TP network techniques, are provided through a supplemental non-MPLS-TP control plane.

Referring to FIG. 4, GC-DTPM in-band control plane TLV Object structure 400 can include a "Protocol-Message-Type" field 402, an illustrative "reserved" field 404, a "message length" field 406, and an MPLS-TP Control-Plane Protocol Message Object 408, referenced herein in abbreviated form as "MTCPPMO."

With continuing reference to FIG. 4, the Protocol-Message-Type 402 can identify a protocol message type of a specific control protocol. Since each control protocol may have a header that contains or indicates the type of the individual protocol packet, the Protocol-Message-Type 402 can be used to simply indicate what control protocol's message is carried in this TLV. In one example implementation, the protocol message type values shown in Table 3 below can be assigned for the control protocols.

TABLE 3

| Protocol-Message-Type | Protocol-Message-Type Value |
|---|---|
| RSVP-TE Signaling Protocol | 1 |
| GMPLS LMP Protocol | 2 |
| OSPF Routing Protocol with OSPF-TE & GMPLS-OSPF-TE extensions | 3 |
| ISIS Routing Protocol with ISIS-TE & GMPLS-ISIS-TE extension | 4 |
| LDP Signaling Protocol | 5 |

It will be appreciated that the Table 3 Protocol-Message-Type Value values are only one example, and are not intended to limit any of the exemplary embodiments to practices using the Table 3 value assignment for Protocol Message-Type values.

With continuing reference to FIG. 4, according to an aspect, the Message-Length field 406 can store a value that can represent the total length of the TLV object including the field of the Protocol Message-Type 402 and Message-Length field 406.

The FIG. 4 MPLS-TP Control Plane Protocol Message Object 408 can define, or identify an outing or signaling control plane message structure corresponding to the 'Message-Type.' In an aspect, further to the GAP procedures that can be adapted for dynamic provisioning in accordance with one or more exemplary embodiments, an MPLS-TP network does not require capability of TCP/IP protocol stack support. Instead, as shown by FIG. 4, for in-band communication of dynamic tunnel management, routing, and signaling control plane messages according to one or more exemplary embodiments, the message structure can start with a special data plane protocol message header followed by the message payload. It will also be appreciated by persons of ordinary skill, from reading this disclosure, the FIG. 4 GC-DTPM in-band control plane TLV Object structure does not start with any IPv4 or IPv6 header, and does not include any IP transport layer header (TCP or UDP).

Figure 5:
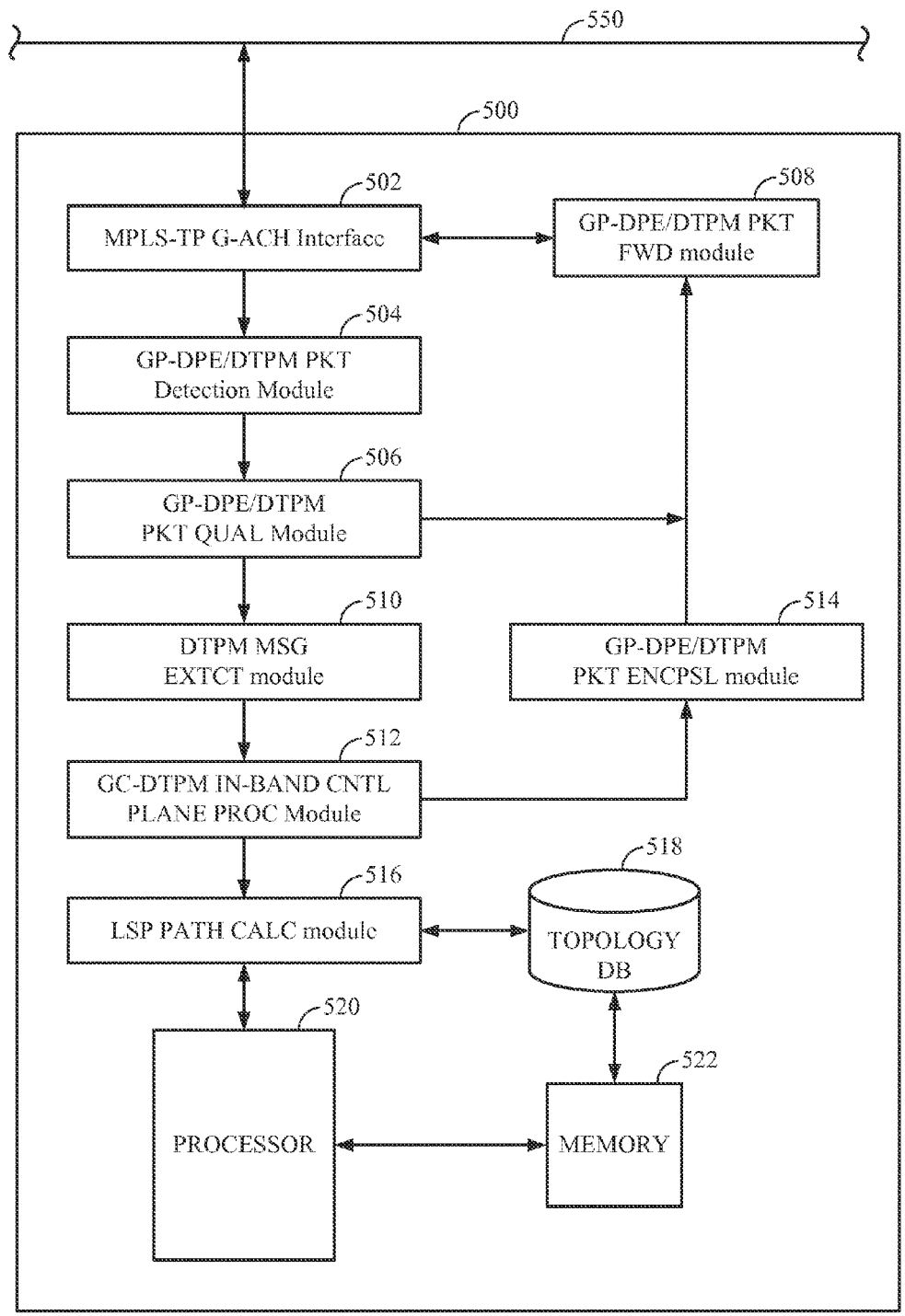
FIG. 5 shows a high-level functional schematic of one LSR configured with GC-DTPM in-band control plane functionality in an MPLS-TP network in accordance with one or more exemplary embodiments.

FIG. 5 shows a high-level functional schematic 500 of one LSR configured with GC-DTPM in-band control plane functionality in an MPLS-TP network in accordance with one or more exemplary embodiments. For brevity, description referring to FIG. 5 uses the phrase "LSR 500" to mean resources of an LSR or LSR-configurable device (not specifically shown) that are configured, based on the present disclosure, for performing the logical functions shown in the FIG. 5 high-level functional schematic 500. The LSR or LSR-configurable device providing such resources can be, for example, an off-the-shelf service aggregation switch (not specifically shown in FIG. 5), such as the Ciena® 5410®, or one of various comparable devices available from other commercial vendors, having MPLS-TP functionality configurable, based on the present disclosure, to perform the logical functions appearing in the FIG. 5 high-level functional schematic 500. For a service aggregation switch implementation of the LSR 500, example MPLS-TP functionalities that can be configured, based on the present disclosure, to perform according to the FIG. 5 high-level function schematic 500 can include, for example, without limitation, capability to set-up, monitor performance of, and tear-down MPLS LSP Tunnel Groups, and to support MPLS LSP Tunnel Redundancy and, more specifically, RSVP-TE (for MPLS Tunnel Signaling), Open Shortest Path First-Traffic Engineered (OSPF-TE) (for MPLS Tunnel Routes), Intermediate System-to-Intermediate System—Traffic Engineered (IS-IS-TE) (for MPLS Tunnel Routes), and LDP and Targeted LDP (for VPLS VC signaling).

Referring to FIG. 5, in an aspect, the LSR 500 can include an MPLS-TP G-ACH interface 502 to the G-ACH (not separately shown) of, for example, a link 550 (which, for example, can be a plurality of links.) It will be understood that the link 550, or each of a plurality of links represented by 550, connects to a corresponding one LSR (not shown in FIG. 5) among one or more neighbor LSRs (not shown in FIG. 5).

Referring to FIG. 5, the LSR 500 can further include a GP-DPE/DTPM packet detection module 504 configured to detect receipt at the MPLS-TP G-ACH interface 502 of a GP-DPE/DTPM packet (not shown in FIG. 5) on any G-ACH channel in the link(s) 550. In an aspect, the LSR 500 can include a GP-DPE/DTPM packet qualification module 506 configured to determine if the LSR 500 is the destination of a GP-DPE/DTPM packet detected by the GP-DPE/DTPM packet detection module 504. It will be understood that the MPLS-TP G-ACH interface 502, the DPE/DTPM packet detection module, and the GP-DPE/DTPM packet qualification module 506 are shown as separate blocks only for purposes of separating description of example aspects. As will be appreciated by persons of ordinary skill in the art from reading this disclosure, the logical functions of the MPLS-TP G-ACH interface 502 and the GP-DPE/DTPM packet detection module 504, and of the GP-DPE/DTPM packet qualification module 506, can be merged to form a combined logical module (not separately shown in FIG. 5). As will be further appreciated by such persons, operations (not specifically shown) carrying out the above-described logical functions of MPLS-TP G-ACH interface, GP-DPE/DTPM packet detection, and GP-DPE/DTPM packet qualification are not necessarily sequential in time and, instead, two or more, or all may be performed concurrently.

Referring to FIG. 5, in an aspect, the LSR 500 can include a GP-DPE/DTPM packet forwarding module 508. The GP-DPE/DTPM packet forwarding module 508 can be configured, according to an aspect, to forward or initiate a forwarding of a GP-DPE/DTPM packet determined by the GP-DPE/DTPM packet qualification module 506 as having another LSR (not shown in FIG. 5) as its destination. Further to this aspect, the GP-DPE/DTPM packet forwarding module 508 can be configured to transfer that GP-DPE/DTPM packet to the MPLS-TP G-ACH interface 502 with sufficient information, for example, as control signals (not specifically shown in FIG. 5), for the MPLS-TP G-ACH interface 502 to select an appropriate G-ACH through which to forward the packet. According to one or more exemplary embodiments, the GP-DPE/DTPM packet determined by the GP-DPE/DTPM packet qualification module 506 as having another LSR (not shown in FIG. 5) as its destination may include an explicit path message identifying the specific neighboring LSR to which to forward the packet. In an aspect according to one or more exemplary embodiments, the MPLS-TP G-ACH interface 502 may be configured to extract that identity, i.e., of the specific neighboring LSR to which to forward the GP-DPE/DTPM packet it receives from the GP-DPE/DTPM packet forwarding module 508.

Referring to FIG. 5, it will be understood that the above-described logical functions of the GP-DPE/DTPM packet qualification module 506 and the GP-DPE/DTPM packet forwarding module 508, and the related packet-forwarding functions of the MPLS-TP G-ACH interface 502, are shown as separate blocks only for purposes of separating description of example aspects. It will be appreciated by persons of ordinary skill that the described functions of the GP-DPE/DTPM packet qualification module 506 and the GP-DPE/DTPM packet forwarding module 508, and even the related packet-forwarding functions of the MPLS-TP G-ACH interface 502, can be merged to form a combined logical function (not separately shown in FIG. 5). As will be further appreciated by such persons, operations (not specifically shown) carrying out the above-described logical functions of GP-DPE/DTPM packet qualification and GP-DPE/DTPM packet forwarding, and the related packet-forwarding functions of the MPLS-TP G-ACH interface 502, are not necessarily sequential in time and, instead, two or more, or all may be performed concurrently.

Continuing to refer to FIG. 5, in an aspect, the LSR 500 can include a DTPM message extraction module 510 configured to extract DTPM message content (not shown in FIG. 5) from GP-DPE/DTPM packets determined by the DPE/DTPM packet qualification module 506 as having that LSR as its destination, or having that LSR as an interim destination). In further aspect, the LSR 500 can include a GC-DTPM in-band control plane processing module 512 for performing one or more in-band control plane DTPM functions in accordance with DTPM message content extracted by the DTPM message extraction module 510.

With continuing reference to FIG. 5, in another aspect, the LSR 500 can include a GP-DPE/DTPM packet encapsulation module 514 configured to encapsulate, for example, a result (not separately shown in FIG. 5) of the GC-DTPM in-band control plane processing module 512 into a GP-DPE/DTPM packet (not separately shown). In an aspect, the GP-DPE/DTPM packet encapsulation module 514 can be configured to structure the GP-DPE/DTPM packet, for example, in accordance with the FIG. 2 example structure 200.

Referring to FIG. 5, for providing MPLS-TP PE router functionality in accordance with various embodiments, the LSR 500 can further include an LSP path calculation module 516, for calculating multi-hop path-defining content for a path request. The LSR 500 can further comprise network topology database 518 having information sufficient for the LSP path calculation module 516, to calculate a multi-hop path from the LSR 500 to a desired LER (not shown in FIG. 5). The network topology database 518 can be constructed and updated based on the LSR 500 receiving GP-DPE/DTPM packets from neighboring LSRs, and forwarded to the ingress LSR from the neighboring LSRs. The LSP path calculation module 516 can be configured with capability of computing explicit paths, according to conventional MPLS-TP path computation techniques, for example constrained shortest path first (CSPF) application techniques. In a related aspect, path computation resources of the MPLS-TP PE router 102A can be configured to generate, based on a result of, for example, CSPF application, content for a DTPM message defining an explicit path, for example, comparable to a known, conventional RSVP PATH message.

In a further aspect, the LSP path calculation module 516 may be configured to generate the explicit path defining content of the DTPM message as, for example, one or more extended definitions of the Explicit Route Object (ERO). In an aspect, one example extended definition of the known, conventional ERO definition that can be provided in accordance with various exemplary embodiments is a sub-object that can use, as the node "address" for the nodes in the computed explicit path, the MPLS-TP's Node-ID. As may become apparent to persons of ordinary skill in the art upon reading this disclosure, this sub-object extension of the known, conventional ERO definition can provide, among other features, overcoming the IP-address limitation of the current ERO.

In a related aspect, the LSP path calculation module 516 and other features of the LSR 500 can be configured to include one or more extensions to the 'Record Route Object (RRO)' which is used, in known conventional out-of-band control planes, to record the hop-by-hop nodes traversed during Tunnel Setup signaling. In an aspect, method and systems in accordance with various exemplary embodiments can extend the RRO to include one or more new Sub-Objects that can use MPLS-TP's Node-ID as the node address.

The LSR 500 may include a processor 520 that may be a hardware device, arrangement of hardware devices (not specifically shown in FIG. 5), or an allocated or otherwise available portion of processing resources provided by such a hardware device or arrangement of hardware device, or for executing software instructions stored in a memory 522. It will be understood that processor 520 may be, or may be an allocated or otherwise available portion of processing resources provided by, one or more custom-designed, application-specific integrated circuit (ASIC) devices, or one or more commercially available processors, or both. It will be understood that processor 520 may be a central processing unit (CPU), or may be one or more processing cores of a higher level CPU (not separately shown in FIG. 5). It will also be understood that the processor 520 may be an allocated or otherwise available portion of a shared processing resource (not separately shown in FIG. 5).

In an aspect, the processor 520 can be configured to execute software instructions stored within memory 522 to perform computations and accesses of the memory 522 that embody, and/or control other hardware (not specifically shown in FIG. 5) to provide, the described functionalities of the MPLS-TP G-ACH interface 502, the GP-DPE/DTPM packet qualification module 506, the GP-DPE/DTPM packet forwarding module 508, the DTPM message extraction module 510, the GC-PTPM in-band control plane processing module 512, the GP-DPE/DTPM packet encapsulation module 514, and the LSP path calculation module 516.

Figure 6:
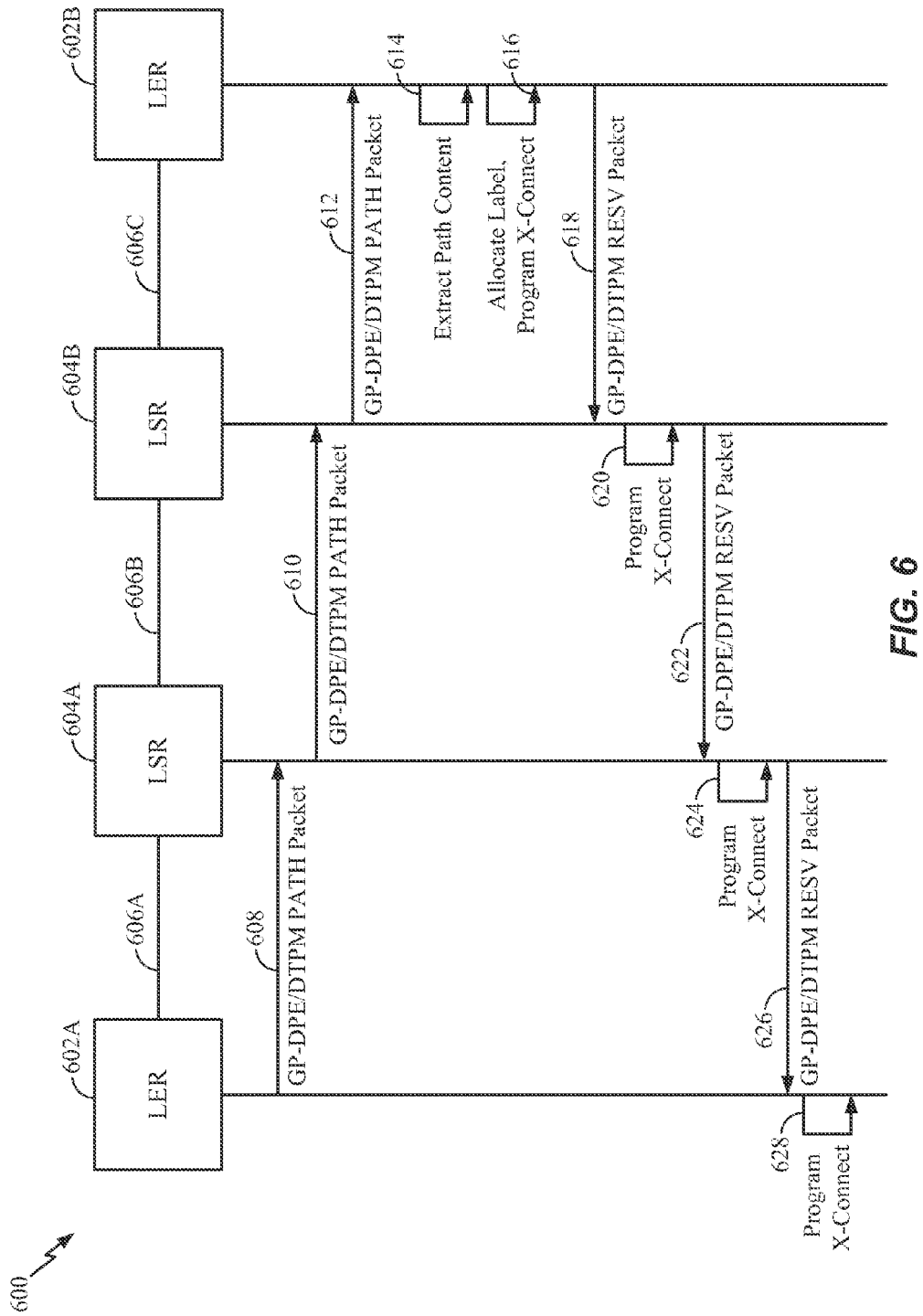
FIG. 6 shows a high-level logical flow example of in-band communications in one example process of MPLS tunnel setup employing GC-DTPM in-band control planes in accordance with various exemplary embodiments, referencing the FIG. 1 example MPLS-TP network.

FIG. 6 is one example high-level logical flow 600 (hereinafter "flow 600") of in-band communications in one example process of MPLS tunnel setup employing GC-DTPM in-band control planes in accordance with various exemplary embodiments. Examples carrying out certain operations are described in reference to the FIG. 1 example MPLS-TP network 100. However, this is only for purposes of providing reference to an example environment to assist in illustrating concepts. It will be understood that tunnel setup through GC-DTPM in-band control planes in accordance with various exemplary embodiments is not limited to MPLS-TP networks as illustrated by FIG. 1. It will be understood that operations in accordance with the flow 600 comprise, in part, communication, in band, of GP-DPE/DTPM packets having bodies carrying RSVP PATH and RESV and equivalent messages, hop by hop through the G-ACH in links between adjacent nodes (e.g., any one of links 606). In an aspect, interception of the GP-DPE/DTPM packets having, for example, the RSVP-TE PATH and RESV message at every one of the intervening nodes (e.g., LSR 604A and LSR 604B) can be provided. One example implementation further to this aspect can use a time-to-live (TTL) set at a value of 1. As can be readily appreciated by persons of ordinary skill upon reading this disclosure, this can provide interception of in-band GP-DPE/DTPM packets having the PATH and RESV messages at every intervening node.

Referring to FIG. 6, according to the flow 600, ingress LER 602A can be the MPLS-TP PE router 102A in the FIG. 1 MPLS-TP network 100. It will be assumed, for describing example operations in a process according to the flow 600, that ingress LER 602A has computed a path to egress LER 602B that includes LSR 604A and LSR 604B as intervening nodes, forming a hop-by-hop path from ingress LER 602A to egress LER 602B. Ingress LER 602A may have, for example, computed the path as a node-by-node explicit path layout using, for example, conventional CSPF techniques.

It will be further assumed that ingress LER 602A has generated a GP-DPE/DTPM packet (not specifically shown in FIG. 6) having a content defining the computed path. The path defining content of the DTMR message packet generated can be comparable, for example, to a conventional PATH request message communicated out-of-plane in known, conventional IP-address dependent control plane techniques. For convenience in describing example subsequent operations, the GP-DPE/DTPM packet having a content defining the computed path will referenced as the "GP-DPE/DTPM PATH packet."

Referring to FIG. 6, in one example operation according to the flow 600, ingress LER 602 can, at 608 initiate a tunnel setup by starting an RSVP session by forwarding the GP-DPE/DTPM PATH packet through a default G-ACH (not separately shown in FIG. 6) in the link 606A to its immediate neighbor, which is LSR 604A. The GP-DPE/DTPM PATH packet can include RSVP session identification information, for example, a tunnel ID and extended tunnel ID which can be the unique node-id of ingress LER 602A. The GP-DPE/DTPM PATH packet forwarded at 608 to the LER 604A can have a unique ACH header and a GAL value of 13. The LSR 604A receives the GP-DPE/DTPM PATH packet and, in accordance with the path defining content described above, at 610, forwards the GP-DPE/DTPM PATH packet to the LSR 604B. The forwarding at 610, in an aspect, can be through a default G-ACH (not separately shown in FIG. 6) in the link 606B, using the same mechanism described for the ingress LER 602A initial forwarding at 608. The LSR 604B can at 612, in turn, forward the GP-DPE/DTPM PATH message packet at 614 to the egress LER 602B, through a default G-ACH (not separately shown in FIG. 6) in the link 606C, using the same mechanism described for the ingress LER 602A initial forwarding at 608 and follow-on forwarding at 610.

With continuing reference to FIG. 6, at 614, ingress LER 102B can, after receiving the GP-DPE/DTPM PATH packet, extract its path defining content and, at 616, the egress LER 602B can allocate a label, and program the cross connect to hardware ("H/W," which is not separately shown in FIG. 6).

In an example operation according to the flow 600, after allocating the label and programming the cross-connect in HW, egress LER 602B 622 can send, in a reverse direction, an RESV or equivalent response encapsulated in a GP-DPE/DTPM PATH packet back to the LSR 604B. The sending at 622 can be, for example, though another G-ACH—in a direction from the egress LER 602B to the LSR 604B, through the link 606C. For convenience in describing example subsequent operations, the GP-DPE/DTPM PATH packet sent at 622 that encapsulates the RESV will be referenced as the "GP-DPE/DTPM RESV packet." The GP-DPE/DTPM RESV packet communicated at 622 can have a unique ACH header, but the same GAL value of 13. The LSR 604B, at 624, receives the GP-DPE/DTPM RESV packet communicated at 622 and, at 626, can program a hardware (H/W) of the LSR 604B with a cross connect (i.e., label and other information) according to set up a tunnel (not separately shown in FIG. 1) a data channel (not separately shown in FIG. 6) in a left-to-right direction (relative to FIG. 6, with the ingress LER 602A being at the "left.")

Referring to FIG. 6, in an example tunnel set-up in accordance with the flow 600, after the LSR 604B receives the GP-DPE/DTPM RESV packet at 624, and programs the HW at 626 to set up a tunnel, the LSR 604B can send the GP-DPE/DTPM RESV packet at 628 to the LSR 604A. The LSR 604A, in response to receiving at 630 the GP-DPE/DTPM RESV packet communicated at 628 can, at 632 program a H/W (not separately shown in FIG. 6) of the LSR 604A with a cross connect (i.e., label and other information) to set up a tunnel (not separately shown in FIG. 1) in a left-to-right direction, from the LSR 604A to the LSR 604B, in a data channel (not separately shown in FIG. 6) in the link 606B.

Continuing to refer to FIG. 6, in an example tunnel set-up in accordance with the flow 600, after the LSR 604B receives the GP-DPE/DTPM RESV packet at 624, and programs the HW at 626 to set up a tunnel, the LSR 604B can send the GP-DPE/DTPM RESV packet at 628 to the LSR 604A. The LSR 604A, in response to receiving at 630 the GP-DPE/DTPM RESV packet communicated at 628 can, at 632, program a H/W (not separately shown in FIG. 6) of the LSR 604A with a cross connect (i.e., label and other information) to set up a tunnel (not separately shown in FIG. 1) in a left-to-right direction, from the LSR 604A to the LSR 604B, in a data channel (not separately shown in FIG. 6) in the link 606B.

Referring to FIG. 6, in an example tunnel set-up in accordance with the flow 600, after the LSR 604A programs the HW at 632, the LSR 604A can, at 634, send the GP-DPE/DTPM RESV packet to ingress LER 602A, which initially sent the GP-DPE/DTPM PATH packet at 608. The sending at 634 can be through a G-ACH, left to-right, in the link 606A. The ingress LER 602A, upon receiving at 636 the GP-DPE/DTPM RECV packet, can program a hardware (H/W) of the ingress LER 602A with a cross connect (i.e., label and other forwarding information) according to set up a tunnel (not separately shown in FIG. 1) in a data channel (not separately shown in FIG. 6) in a left-to-right direction (relative to FIG. 6), in the link 606A.

Figure 7:
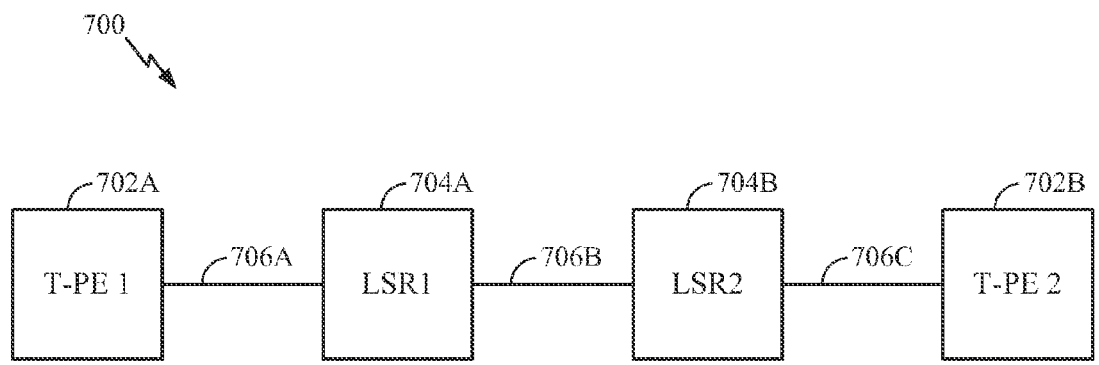
FIG. 7 shows one MPLS-TP network topology for one example single-segment PW setup, using in-band LDP signaling processes through one or more GC-DTMP in-band control planes in accordance with various exemplary embodiments.

FIG. 7 shows one MPLS-TP network topology 700 for one example single-segment PW setup, using in-band LDP signaling processes through one or more GC-DTMP in-band control planes in accordance with various exemplary embodiments. The MPLS-TP network topology 700 can include a first terminating PE router or "T-PE-1" 702A, a second terminating PE router or "T-PE-2" 702B and, arranged between T-PE-1 702A and T-PE-2 702B, a first label switching router or "LSR-1" 704A and a second label switching router or "LSR-2" 704B. In one example further to one or more exemplary embodiments, T-PE-1 702A can be the ingress (or, alternatively, the "initiator" or "head end") of a MPLS single-segment PW, not shown in FIG. 7, extending from T-PE-1 702A to T-PE-2 702B, which can be the egress of that PW. Therefore, T-PE-1 702A and T-PE-2 702B be referenced alternatively as "ingress T-PE-1" 702A and "egress T-PE-2" 702B when described in relation to an MPLS PW from the former to the latter. The PW can extend through an assigned data channel (not separately shown) in the first link 706A, through LSR-1 704A, through an assigned data channel (not separately shown in FIG. 7) in the link 706B, through LSR-2 704B, and through an assigned data channel (not separately shown) in the third link 706C, to egress T-PE-2 702B.

Figure 8:
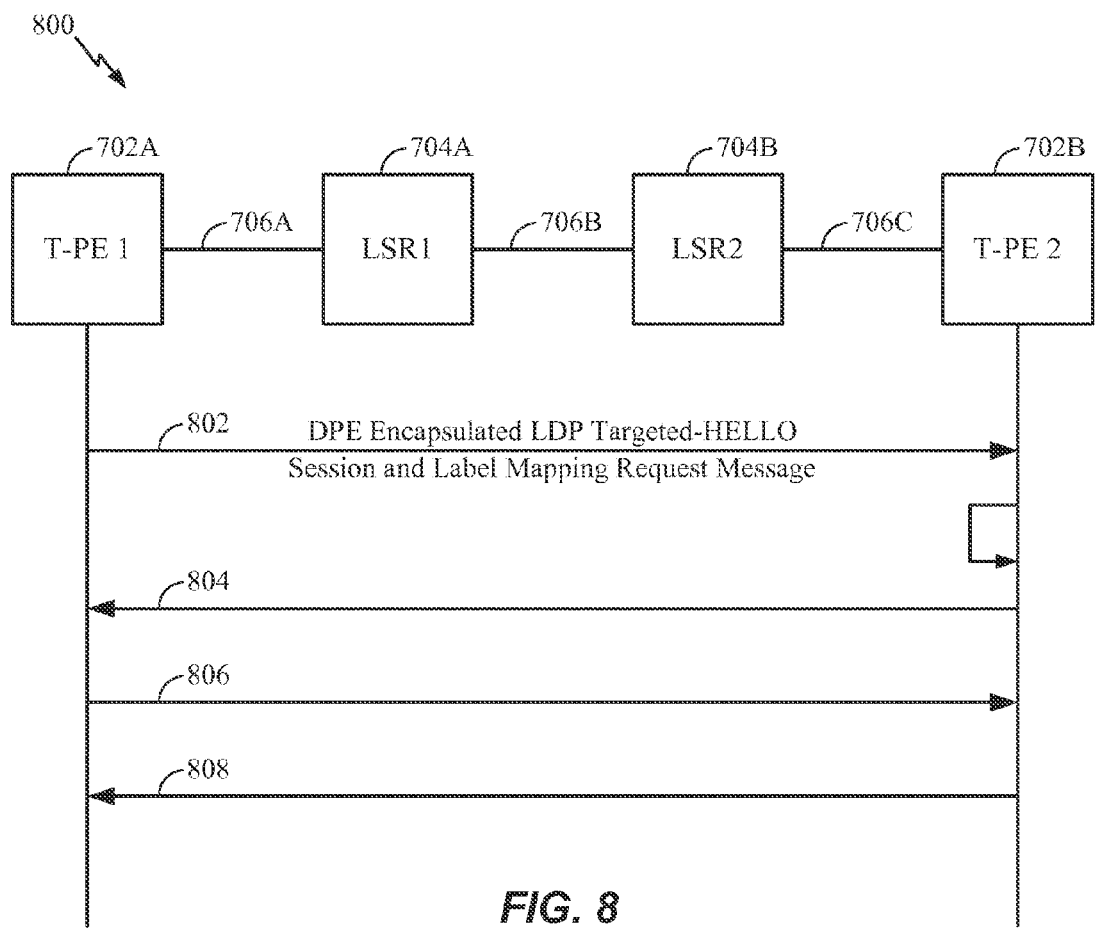
FIG. 8 shows one high-level flow of example communications operations in one example in-band LDP signaling process for single-segment PW setup on the FIG. 5 MPLS-TP network topology, through one or more GC-DTPM in-band control planes in accordance with various exemplary embodiments.

FIG. 8 shows one high-level flow 800 of example communications operations in one example in-band LDP signaling process for single-segment PW setup on the FIG. 7 MPLS-TP network topology 700, through one or more GC-DTPM in-band control planes in accordance with various exemplary embodiments.

Referring to FIG. 8, in one example, operations according to the flow 800 can start at 802 where the ingress T-PE-1 702A starts a LDP targeted-HELLO session by sending a PDE Label Mapping Request Message packet, in the G-ACH of the underlying MPLS-TP transport tunnel, toward the egress T-PE-2 702B. At 804, the egress T-PE-2 702B accepts the targeted LDP session and PW, and then at 806, allocates a Label and programs the cross-connect in its H/W (not separately shown in FIGS. 7 and 8). Continuing with example operations according to the flow 800, in an aspect, after programming the cross-connect in H/W at 806, the egress T-PE-2 702B can send, at 808, a Label mapping response message to the ingress T-PE-1 702A, through the G-ACH of the underlying MPLS-TP transport tunnel. In a further example, the ingress T-PE-1 702A can then, at 810, program the cross-connect in H/W. The PW is now established.

Figure 9:
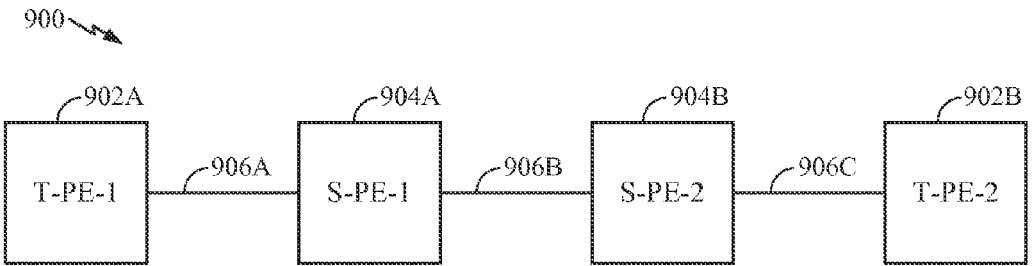
FIG. 9 shows one MPLS-TP network topology for example multi-segment PW setup, using in-band LDP signaling processes through one or more GC-DTPM in-band control planes in accordance with various exemplary embodiments.

FIG. 9 shows one MPLS-TP network topology 900 for one example multi-segment PW setup, using in-band LDP signaling processes through one or more GC-DTPM in-band control planes in accordance with various exemplary embodiments. Referring to FIG. 9, the MPLS-TP network topology 900 can include a first terminating PE router, or "T-PE-1" 902A, and a second terminating PE or "T-PE-2" 902B. T-PE-1 902A can be the ingress, or initiator or head end of an MPLS PW, not specifically shown in FIG. 9, of which T-PE-2 902B can be the egress. Therefore, T-PE-1 902A and T-PE-2 902B will be referenced alternatively as "ingress T-PE-1" 902A and "egress T-PE-2" 902B when described in relation to an MPLS PW from the former to the latter. The MPLS-TP network topology 900 can further include, as support for the PW, a first switching PE router or "S-PE-1" 904A connected to ingress T-PE-1 902A by a first link 906A, a second switching PE router or "S-PE-2" 904B connected to S-PE-1 904A by a second link 906B and to egress T-PE-2 902B by a third link 906C.

Referring to FIG. 9, in an aspect the above-described components forming the MPLS-TP network topology 900 can be configured to carry, in band, LDP targeted-HELLO and Label mapping request/response signaling messages through the G-ACH of the MPLS-TP tunnel underneath each segment of the PW. More particularly, in an aspect, signaling control messages (e.g., dynamic tunnel management, routing, and signaling control plane messages) for each segment of a multi-segment PW can be carried in the G-ACH of a separate instance of a MPLS-TP bi-directional co-routed or bi-directional associated tunnel. The separate instances of the bi-directional associated tunnel, in the FIG. 9 MPLS-TP network topology 900, can be between a pair of one of T-PE-1 902A and T-PE-2 902B and its neighbor among S-PE-1 904A and S-PE-2 904B, or between S-PE-2 904A and S-PE-2 904B. In describing example operations in reference to FIG. 9, the naming scheme shown in Table 4 below will be used:

TABLE 4

| Name of Tunnel Segment | MPLS Tunnel Segment |
|---|---|
| Tunnel-Seg-1 | Between T-PE-1 902A and S-PE-1 904A |
| Tunnel-Seg-2 | Between S-PE-1 904A and S-PE-2 904B |
| Tunnel-Seg-3 | Between S-PE-2 904B and T-PE-2 902B |

As will be understood from description in greater detail later in the disclosure, each of the Table 4 example MPLS-TP tunnel segments is established using encapsulated RSVP-TE message exchange through a separate instance of a GC-DTPM in-band control plane in accordance with one or more exemplary embodiments.

Figure 10:
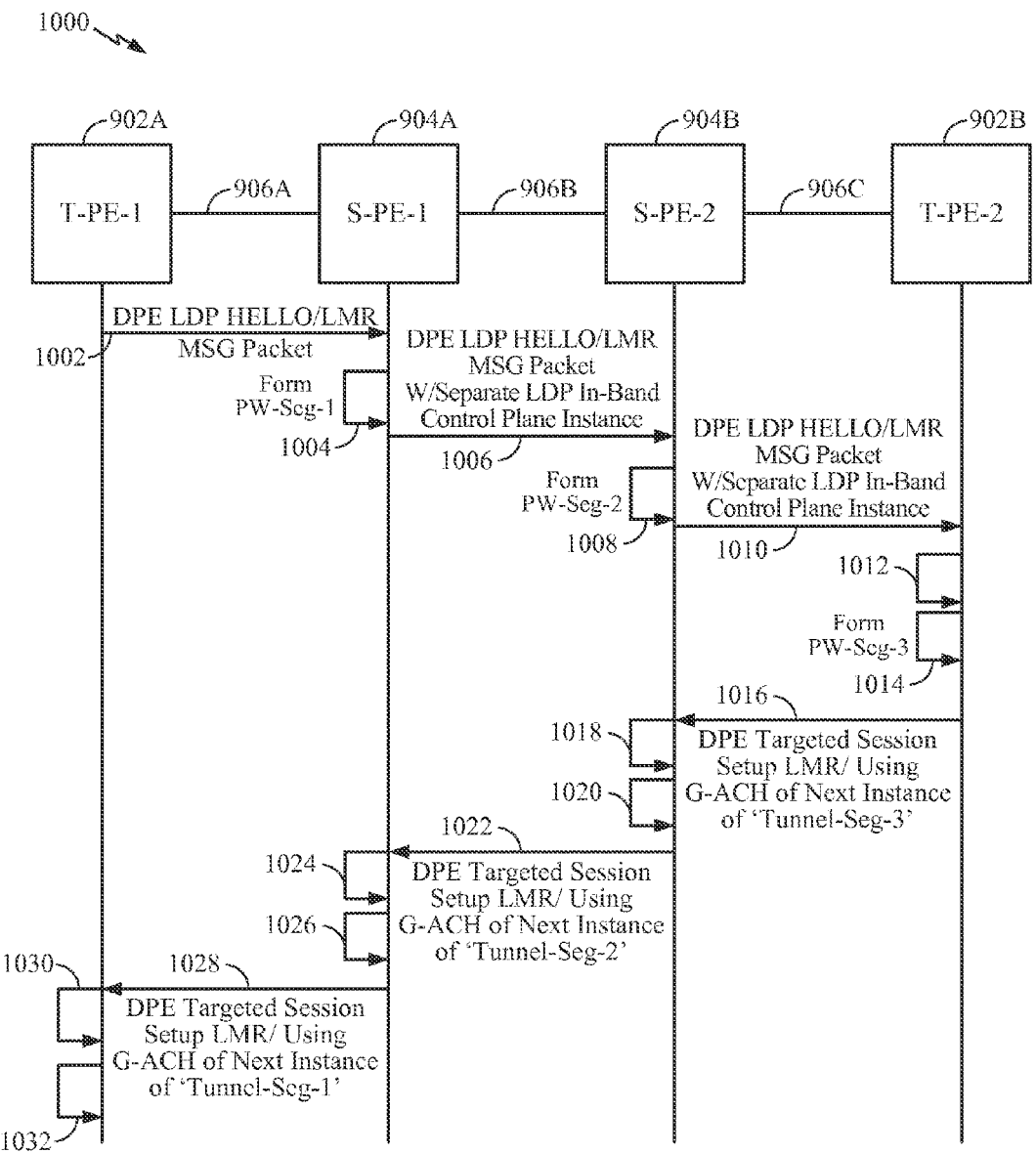
FIG. 10 shows one high-level flow of example in-band DTPM control plane communications in one example dynamic LDP signaling process of a dynamic multi-segment PW setup on the FIG. 9 MPLS-TP network topology, using DPE/DTPM in-band control plane packets through one or more MPLS-TP DTPM in-band control planes in accordance with various exemplary embodiments.

FIG. 10 shows one high-level flow 1000 (hereinafter "flow 1000") of example operations in one in-band LDP signaling process in one multi-segment PW setup on the FIG. 9 MPLS-TP network topology 900, through one or more GC-DTPM in-band control planes in accordance with various exemplary embodiments. As will be understood from reading this disclosure in its entirety, operations according to the FIG. 10 flow 1000 can establish one or more MPLS multi-segment PWs using targeted-LDP signaling protocol carried by an extending chain of G-ACH single setup requests. As will be further understood, operations according to the FIG. 10 flow 1000 on the FIG. 9 MPLS-TP network topology 900 can create an end-to-end PW between ingress T-PE-1 902A and egress T-PE-2 902B and, in doing so, can actually create three consecutive segment PWs, each segment PW using a separate instance of GC-PTPM in-band control plane function, each instance functioning as an LDP signaling control plane, as shown in Table 5 below:

TABLE 5

PW-Seg-1 - A pseudo-wire segment between T-PE-1 902A and S-PE-1 904A
PW-Seg-2 - A pseudo-wire segment between S-PE-1 904A and S-PE-2 904B
PW-Seg-3 - A pseudo-wire segment between S-PE-2 904B and T-PE-2 902B Referring to FIG. 10, in an aspect, the ingress T-PE-1 902A can start, prior to 1002, by generating a GP-DPE/DTPM packet encapsulating an LDP targeted-HELLO session and Label mapping request message. For brevity in describing example flow, the phrase: GP-DPE/DTPM packet encapsulating an LDP targeted-HELLO session and Label mapping request" will be recited, in the following description, in the abbreviated form of: "PDE LDP/HELLO/LMR message packet." At 1002, ingress T-PE-1 902A can forward the PDE LDP/HELLO/LMR message packet over the G-ACH of the tunnel 'Tunnel-Seg-1', toward its neighbor S-PE-1 904A for subsequent forwarding to its destination, egress T-PE-2 902B. At 1004, S-PE-1 904A receives the PDE LDP/HELLO/LMR message packet and forms the first segment of the targeted LDP session and PW (Table 4, PW-Seg-1). Then, at 1006, the S-PE-1 904A can re-originate PDE LDP/HELLO/LMR message packet using a separate LDP in-band control plane instance and forward the PDE LDP/HELLO/LMR message packet, using G-ACH of the next tunnel instance, Table 5, "Tunnel-Seg-2," toward the next switching PE router, i.e., S-PE-2 904B, in order to reach the destination egress T-PE-2 902B.

Continuing to refer to FIG. 10, in one example operation according to the flow 1000, after receipt of the forwarding at 1006, S-PE-2 904B can form, at 1008, the next segment of the targeted LDP session, i.e., Table 4, "PW-Seg-2." S-PE-2 904B can then, at 1010, re-originate PDE LDP/HELLO/LMR message packet, using a separate LDP in-band control plane instance, and forward the re-originated PDE LDP/HELLO/LMR message packet, using the G-ACH of the next tunnel instance, i.e., the "Tunnel-Seg-3," toward the terminating PE router, namely, egress T-PE-2 902B, which is the destination T-PE for the end-to-end PW being constructed. In one example operation according to the flow 1000, after receiving the forwarding at 1010, egress T-PE-2 902B, at 1012, can accept the final segment of the targeted LDP session and PW (Table 5, "PW-Seg-3"). In one example continuation of the acceptance at 1012, egress T-PE-2 902B can then, at 1014, allocate Label and program the cross-connect in its H/W (not separately shown in FIG. 10) and then, at 1016, send a PDE Label mapping response message to S-PE-2 904B, using the G-ACH of the above-described tunnel instance Table 5, "Tunnel-Seg-3."

With continuing reference to FIG. 10, in one example operation according to the flow 1000, after receiving the sending at 1016, S-PE-2 904B can, at 1018, allocate Label, and at 1020 program the cross-connect in its H/W. In one example operation according to the flow 1000, S-PE-2 904B can then, at 1022, forward the Label mapping response to the previous hop switching PE router namely S-PE-1 904A, using the G-ACH of the Table 5 tunnel instance "Tunnel-Seg-2." Then, S-PE-1 904A, upon receiving the message forwarded at 1022 can, at 1024, allocate Label, and at 1026, program the cross-connect in its H/W and at 1028, forward the Label mapping response, using the G-ACH of the Table 5 tunnel instance "Tunnel-Seg-1," to the previous hop switching PE router, namely, ingress T-PE-1 902A. In an aspect, ingress T-PE-1 902A can then program the cross-connect in its H/W, which establishes an end-to-end multi-segment PW between ingress T-PE-1 902A and egress T-PE-2 902B.

In an aspect, sharing or allocation among multiple instances of a DTPM in-band control plane of resources of the data channel assigned to carry control plane's DPE/DTPM packets can be enforced, for example, by configuring PHB and B/W percentage parameters separately for each instance of the DTPM in-band control plane. For example, for tunnel management traffic, the percentage of the G-ACH channel B/W that can be used by the DTPM in-band control planes may be separately configured for each DTPM in-band control plane instance. In one further example, traffic policing (rate-metering) can be enforced using the configured B/W percentage parameter against the Tunnel management traffic of the corresponding DTPM in-band control plane instance. In another example, PHB based traffic queuing and traffic scheduling can be enforced for the per-DTPM in-band control plane instance using MPLS-TP management control messages.

MPLS-TP Tunnel Protection and Restoration.

In systems and methods according to various exemplary embodiments, both End-to-End (E2E) linear protection and segment protection of the tunnels and paths provisioned by the described in-band DTPM control plane can be provided. For example, linear protection can comprise establishing an E2E backup tunnel (not shown in the figures) and associating it at the head-end, for example, in accordance with RFC 4872. As another example, establishment of segment protection may follow similar procedures, such as using Secondary ERO (SERO), as per RFC 4873. In an aspect, Secondary ERO (SERO) needed for the segment backup path (not shown in the figures) can be computed via CSPF application. In a further aspect, Secondary ERO (SERO) needed for the Segment Backup Path may be configured at Head-End in a similar manner used for Primary Tunnel's ERO. In still further aspect, tunnel protection switching in practices according to one or more exemplary embodiments can use procedures such as specified and described in RFC 6378.

Point-to-Multipoint (P2MP) MPLS/GMPLS Tunnel Management.

Systems, methods and related practices according to various exemplary embodiments can provide, though adaptations of disclosed in-band DTPM control planes, a Point-To-Multipoint (P2MP) MPLS/GMPLS dynamic tunnel management. In an aspect, P2MP dynamic tunnel management can be provided using RSVP-TE signaling protocol encapsulated exchanged, for example, by the extended GAL/G-ACH structured GP-DPE/DTPM encapsulation packets, and related signaling procedures (e.g., G-ACH protocol forwarding, and extraction of DTPM control plane protocol messages) described in this disclosure for Point-to-Point (PTP) tunnels. The DTPM signaling messages can still be exchanged on a per-control plane basis. In an aspect, in a P2MP tunnel provisioning in accordance with various exemplary embodiments, GP-DPE/DTPM encapsulation packets RSVP-TE signaling messages are distributed, in-band, across a P2MP multicast tree, with head-end being the root of the tree and the egress nodes are the leaves of the P2MP multicast tree. At the intervening LSRs that are the branch nodes of the P2MP multicast tree, the outbound signaling messages are replicated across the branching edges of the sub-tree rooted at that LSR node. The replicated messages would still be sent through the GAL/G-ACH of each of the branching edge/link. This in-band G-ACH based signaling scheme can be used for uni-directional and bi-directional P2MP tunnel establishments. Once the tunnel is established, subsequent signaling messages for status updates or tunnel tear-down can be sent via: i) G-ACH of the tunnel, in the case of bi-directional Tunnel; ii) GAL/G-ACH channel of the link(s) in the case of a uni-directional tunnel.

MPLS-TP Tunnel Rerouting.

Systems, methods and related practices according to various exemplary embodiments can be configured, by persons of ordinary skill by combining known, conventional techniques with the present disclosure to provide, though uses and adaptations of disclosed concepts of in-band control planes, a reroute when tunnel parameters/attributes are changed on-line. Dynamic repair can therefore be provided for a failed tunnel. In an aspect, a reroute or other repair procedure can employ GC-DPE/DTPM packets encapsulating, and exchanging in-band through G-ACH, existing Make-Before-Breaks described in RSVP-TE (RFC3209).

MPLS-TP Node Graceful Restart Procedures.

MPLS-TP network systems and methods according to various exemplary embodiments can be configured, since aspects support multiple instances of control plane protocols (Routing & Signaling) running simultaneously, in-band, to provide one or more graceful restart schemes, for example, on a per-control plane instance basis. As will be appreciated by persons of ordinary skill from reading this disclosure, LNRs configured to support the DTPM in-band control planes can be further configured with a mode that, in response to events (e.g., H/W and/or S/W environment events) requiring restart of all instances of the DTPM in-band control planes, can restart all such instances simultaneously. A further aspect can be a graceful restart mechanism that can allow a coordinated restart of the in-band control protocols. One example graceful restart mode may include configuring each of the LNRs to inform its routing and/or signaling neighbors about its restart, including the duration of the restart, to maintain the existing adjacencies without cycling through down & up procedures.

MPLS-TP Single-Segment In-Band LDP Signaled PW Management.

Systems, methods and related practices according to various exemplary embodiments can be configured to provide, through disclosed in-band control plane concepts, in-band, dynamic management of single segment PWs. It will be appreciated by persons of ordinary skill, from reading this disclosure in its entirety, since aspects support multiple instances of control plane protocols (routing in the case of single segment LDP signaled PW), topology and PS-specific updates can be communicated by targeted-LDP session. In addition, label mapping request/response and label release messages can be exchanged over the G-ACH of the MPL-TP bi-directional tunnel, between the two LDP peers, i.e., between local and remote PE routers, on a per-control plane instance basis. In a further aspect, once a PW is established end-to-end, the G-ACH of the PW can be used to carry, for example, PW Status-TLV and MAC-Withdraw request messages on a per-control plane instance basis, between the LDP peers.

As can be appreciated by persons of ordinary skill in the art from reading the present disclosure, various exemplary embodiments can provide features such as, without limitation, LSP In-Band (e.g., G-ACH) communication based control plane framework for MPLS-TP DTPM (dynamic tunnel and PW management) that can operate with or without IP address assignment to the LER/LSR nodes. It will be further appreciated that MPLS-TP network systems and methods can be configured to co-exist with the current IP address dependent IGP Routing and MPLS/GMPLS Signaling control planes. Further, as described, control communications of multiple simultaneous MPLS-TP in-band control plane operations can be separated and isolated via, for example, the FIG. 3 Control-Plane Instance ID field present in the G-ACH application message header.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To illustrate interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action, The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. The terms "disk" and "disc," as used herein, include compact disc (CD), laser disc, optical disc, digital versatile disc (DVD), floppy disk and Blu-ray disc that store and reproduce data magnetically, and or that reproduce data optically with, for example, lasers. Combinations of the above should also be included within the scope of computer-readable media.

In addition, any disclosed connection or coupling can embody a computer-readable medium. For example, if software is described as transmitted from a website, server, or other remote source using, for example, a coaxial cable, fiber optic cable, twisted pair, or digital subscriber line (DSL), then the coaxial cable, fiber optic cable, twisted pair, DSL, or wireless technologies can be within the definition of computer readable medium that applies in this disclosure. Likewise, if software is described as transmitted from a website, server, or other remote source using, for example, a wireless technology such as infrared, microwave or other radio, then the infrared, microwave or other radio can be within the definition of computer-readable medium that applies in this disclosure.

While the foregoing disclosure shows illustrative embodiments that may be used to provide fast port recovery virtual switching, those skilled in the pertinent art will appreciate that various changes and modifications could be made herein without departing from the scope or spirit of the disclosure, as defined by the appended claims. The functions, steps, operations, and/or actions of the method claims in accordance with the embodiments disclosed herein need not be performed in any particular order. Furthermore, although elements of the aspects and embodiments disclosed herein may be described or claimed in the singular, the plural is contemplated unless limitation to the singular is explicitly stated.

What is claimed is:

1. A method for controlling a multi-protocol label switching transport protocol (MPLS-TP) network of label switching nodes that interface to a data plane, comprising
    encapsulating a dynamic tunnel management and signaling control plane protocol message in a data plane protocol encapsulating packet;
    communicating the data plane protocol encapsulating packet to a destination label switching node, through a data plane channel in the data plane;
    extracting, at the destination label switching node, at least a portion of the dynamic tunnel management and signaling control plane protocol message from the data plane protocol encapsulating packet; and
    performing, at the destination label switching node, a dynamic tunnel management process based at least in part on the extracted at least a portion of the dynamic tunnel management control plane protocol message;
    wherein the data plane protocol encapsulating packet comprises a multi-instance identifier field having a multi-instance identifier object identifying a specific control plane instance in a given multi-instance control plane environment.

2. The method of claim 1, wherein the data plane protocol encapsulating packet includes a header identifying the data plane protocol encapsulating packet as encapsulating a dynamic tunnel management and signaling control plane protocol message, and includes a field identifying a message type of the dynamic tunnel management control plane protocol message.

3. The method of claim 2, wherein the field identifying a message type of the dynamic tunnel management and signaling control plane protocol message includes a Type-Length-Value (TLV) object indicating a protocol of the dynamic tunnel management and signaling control plane protocol message among a given plurality of protocols.

4. The method of claim 3, wherein the TLV object has a value changeable between a given value indicating the protocol of the dynamic tunnel management and signaling control plane message as Resource Reservation Protocol-Traffic Engineered (RSVP-TE) protocol, and another value indicating the protocol of the dynamic tunnel management and signaling control plane protocol message as another protocol.

5. The method of claim 2, wherein the field identifying a message type of the dynamic tunnel management and signaling control plane protocol message includes a Type-Length-Value (TLV) object comprising a Protocol-Message-Type field having a value changeable between a first value indicating the protocol of the dynamic tunnel management and signaling control plane protocol message as Resource Reservation Protocol-Traffic Engineered (RSVP-TE) protocol, and a second value indicating the protocol of the dynamic tunnel management and signaling control plane protocol message as General Multi-Protocol Label Switched (GMPLS)-Link Management Protocol (LMP) protocol.

6. The method of claim 1, wherein the data plane channel is a generic associated channel (G-ACH).

7. The method of claim 6, wherein the data plane protocol encapsulating packet includes a G-ACH header and an extended G-ACH Advertisement Protocol (extended GAP) payload having a Type-Length-Value (TLV) object comprising a Protocol-Message-Type field having a value changeable between a given value indicating the protocol of the dynamic tunnel management and signaling control plane protocol message as Resource Reservation Protocol-Traffic Engineered (RSVP-TE) protocol and an another value indicating the protocol of the dynamic tunnel management and signaling control plane protocol message as another protocol.

8. The method of claim 7, wherein the extended GAP payload further includes a multi-instance identifier field having a multi-instance identifier object associating the dynamic tunnel management and signaling control plane protocol message with a specific control plane instance in a given multi-instance control plane environment.

9. The method of claim 7, wherein the Protocol-Message-Type field has a value indicating the RSVP-TE protocol is a first Protocol-Message-Type value, and wherein the another protocol is General Multi-Protocol Label Switched (GMPLS)-Link Management Protocol (LMP) protocol, wherein the another value of the Protocol-Message-Type field is a second value.

10. The method of claim 9, wherein the extended GAP payload further includes a multi-instance identifier field having a multi-instance identifier object identifying a specific control plane instance in a given multi-instance control plane environment.

11. The method of claim 6 wherein the data plane protocol encapsulating packet includes a G-ACH header and an extended G-ACH Advertisement Protocol (GAP) payload having a Type-Length-Value (TLV) object comprising a Protocol-Message-Type field having a value indicating a protocol of the dynamic tunnel management and signaling control plane protocol message, wherein the value is changeable between a first value, a second value, and a third value, wherein the first value indicates Resource Reservation Protocol-Traffic Engineering (RSVP-TE) protocol, the second value indicates General Multi-Protocol Label Switched (GMPLS)-Link Management Protocol (LMP), and the third value indicates Open Shortest Path First (OSPF) routing protocol with at least one extension, wherein the at least one extension being OSPF-Traffic Engineered (OSPF-TE) extensions, or GMPLS-TE extensions, or both.

12. The method of claim 1, wherein communicating the data plane protocol encapsulating packet to the destination label switching node, through a data plane channel in the data plane, includes
receiving the data plane protocol encapsulating packet at an intervening label switching node, through a received segment of the data plane channel; and
forwarding the data plane protocol encapsulating packet from the intervening label switching node, through an outgoing segment of the data plane channel, toward the destination label switching node.

13. The method of claim 12, wherein the dynamic tunnel management and signaling control plane message is a tunnel provisioning request, wherein the method further comprises
extracting at the intervening label switching node at least a portion of the tunnel provisioning request; and
establishing a data plane path from the intervening label switching node to a neighbor label switching node in accordance with the extracted at least a portion of the tunnel provisioning request.

14. A method for controlling a multi-protocol label switching transport protocol (MPLS-TP) network having a plurality of label switching nodes (LNRs) that interface to a data plane, comprising
generating a data plane protocol encapsulating packet that encapsulates a control plane protocol dynamic tunnel management and signaling message having path parameters defining a label switched path (LSP) in the data plane; and
provisioning a LSP in the data plane in accordance with the path parameters, wherein the provisioning comprises communicating the data plane protocol encapsulating packet through a given channel in the data plane;
wherein the data plane protocol encapsulating packet comprises a multi-instance identifier field having a multi-instance identifier object identifying a specific control plane instance in a given multi-instance control plane environment.

15. The method of claim 14, wherein the LSP extends from an ingress label switching edge router (LER) among the LNRs through an intervening label switching router (LSR) among the LNRs to an egress LER among the LNRs, wherein the given channel in the data plane is a generic associated channel (G-ACH) from the ingress LER to the ingress LER, through the intervening LSR, wherein the data plane protocol encapsulating packet is generated with a G-ACH header and an extended G-ACH Advertisement Protocol (GAP) payload having a Resource Reservation Protocol (RSVP)-Transport Engineered (TE) PATH message.

16. A multi-protocol label switching (MPLS) transport protocol (MPLS-TP) switching apparatus, comprising
an MPLS-TP generic associated channel (G-ACH) interface to an incoming G-ACH in a given link;
a packet detection module, coupled to the MPLS-TP G-ACH interface, configured to detect receipt at the MPLS-TP G-ACH interface of a data plane protocol encapsulating packet that encapsulates a dynamic tunnel management and signaling control plane protocol message;
an extraction module, coupled to the MPLS-TP G-ACH interface, the packet detection module, or both, and configured to extract at least a portion of the dynamic tunnel management and signaling control plane protocol message from the data plane protocol encapsulating packet; and
a control plane processing module, coupled to the extraction module, and configured to perform dynamic tunnel management and signaling process in accordance with at least a portion of the at least a portion of the dynamic tunnel management and signaling control plane protocol message extracted from the data plane protocol encapsulating packet;
wherein the data plane protocol encapsulating packet comprises a multi-instance identifier field having a multi-instance identifier object identifying a specific control plane instance in a given multi-instance control plane environment.

17. The label switching apparatus of claim 16, wherein the control plane processing module is configured to generate, based on the dynamic tunnel management and signaling process, a dynamic tunnel management and signaling response message, wherein the MPLS-TP G-ACH interface is further configured to interface to an outgoing G-ACH, and wherein the label switching apparatus further comprises
- a data plane protocol packet encapsulation module coupled to the MPLS-TP G-ACH interface and configured to encapsulate the dynamic tunnel management and signaling response message in a responding data plane protocol encapsulating packet, and to provide the responding data plane protocol encapsulating packet to the MPLS-TP G-ACH interface, and
- wherein the MPLS-TP G-ACH interface is further configured to send the responding data plane protocol encapsulating packet through the outgoing G-ACH.

* * * * *